(12) United States Patent
Smith et al.

(10) Patent No.: US 7,889,133 B2
(45) Date of Patent: Feb. 15, 2011

(54) MULTILATERATION ENHANCEMENTS FOR NOISE AND OPERATIONS MANAGEMENT

(75) Inventors: Alexander E. Smith, McLean, VA (US); Thomas Breen, Tyngsborough, MA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 12/360,702

(22) Filed: Jan. 27, 2009

(65) Prior Publication Data

US 2009/0140925 A1 Jun. 4, 2009

Related U.S. Application Data

(60) Division of application No. 11/342,289, filed on Jan. 28, 2006, now Pat. No. 7,576,695, which is a continuation-in-part of application No. 11/209,030, filed on Aug. 22, 2005, now Pat. No. 7,248,219, which is a continuation-in-part of application No. 10/830,444, filed on Apr. 23, 2004, now Pat. No. 7,123,192, which is a continuation-in-part of application No. 10/457,439, filed on Jun. 10, 2003, now Pat. No. 6,885,340, and a continuation-in-part of application No. 10/319,725, filed on Dec. 16, 2002, now Pat. No. 6,812,891, and a continuation-in-part of application No. 09/971,672, filed on Oct. 9, 2001, now Pat. No. 6,567,043, which is a division of application No. 09/516,215, filed on Feb. 29, 2000, now Pat. No. 6,633,259, said application No. 11/342,289 is a continuation-in-part of application No. 11/257,416, filed on Oct. 24, 2005, now Pat. No. 7,495,612, which is a continuation-in-part of application No. 11/203,823, filed on Aug. 15, 2005, now Pat. No. 7,739,167, which is a continuation-in-part of application No. 10/756,799, filed on Jan. 14, 2004, now Pat. No. 7,126,534, which is a continuation-in-part of application No. 11/031,457, filed on Jan. 7, 2005, which is a continuation-in-part of application No. 10/751,115, filed on Jan. 5, 2004, which is a continuation-in-part of application No. 10/743,042, filed on Dec. 23, 2003, which is a continuation-in-part of application No. 10/638,524, filed on Aug. 12, 2003, which is a division of application No. 09/516,215, filed on Feb. 29, 2000, which is a continuation-in-part of application No. 11/145,170, filed on Jun. 6, 2005, which is a continuation-in-part of application No. 11/111,957, filed on Apr. 22, 2005.

(60) Provisional application No. 60/440,618, filed on Jan. 17, 2003, provisional application No. 60/343,237, filed on Dec. 31, 2001, provisional application No. 60/123,170, filed on Mar. 5, 1999, provisional application No. 60/534,706, filed on Jan. 8, 2004.

(51) Int. Cl.
  *G01S 3/02* (2006.01)
(52) U.S. Cl. .................. 342/450; 342/465
(58) Field of Classification Search ............... 342/450, 342/455–457, 463, 465; 701/117, 120
  See application file for complete search history.

(56) References Cited

U.S. PATENT DOCUMENTS

| | | | |
|---|---|---|---|
| 1,738,571 A | 12/1929 | Gare | 404/18 |
| 3,668,403 A | 6/1972 | Meilander | 701/121 |
| 3,705,404 A | 12/1972 | Chisholm | 343/112 R |
| 3,792,472 A | 2/1974 | Payne et al. | 342/32 |
| 4,079,414 A | 3/1978 | Sullivan | 725/114 |
| 4,115,771 A | 9/1978 | Litchford | 343/6 R |
| 4,122,522 A | 10/1978 | Smith | 701/15 |
| 4,167,006 A | 9/1979 | Funatsu et al. | 343/6.5 LC |
| 4,196,474 A | 4/1980 | Buchanan et al. | 364/461 |
| 4,224,669 A | 9/1980 | Brame | 701/8 |
| 4,229,737 A | 10/1980 | Heldwein et al. | 343/6 R |
| 4,293,857 A | 10/1981 | Baldwin | 343/6.5 |
| 4,315,609 A | 2/1982 | McLean et al. | |
| 4,327,437 A | 4/1982 | Frosch et al. | 714/3 |
| 4,359,733 A | 11/1982 | O'Neill | 342/36 |
| 4,454,510 A | 6/1984 | Crow | 343/5 |
| 4,524,931 A | 6/1985 | Nilsson | 246/167 |
| 4,646,244 A | 2/1987 | Bateman | 701/301 |

| | | | | | | |
|---|---|---|---|---|---|---|
| 4,688,046 A | 8/1987 | Schwab | 342/456 | 5,659,319 A | 8/1997 | Rost et al. | 342/36 |
| 4,782,450 A | 11/1988 | Flax | 364/461 | 5,666,110 A | 9/1997 | Paterson | 340/970 |
| 4,811,308 A | 3/1989 | Michel | 367/136 | 5,670,960 A | 9/1997 | Cessat | 342/25 |
| 4,843,397 A | 6/1989 | Galati et al. | 342/59 | 5,670,961 A | 9/1997 | Tomita et al. | 342/36 |
| 4,853,700 A | 8/1989 | Funatsu et al. | 342/30 | 5,677,841 A | 10/1997 | Shiomi et al. | 365/439 |
| 4,897,661 A | 1/1990 | Hiraiwa | 342/457 | 5,680,140 A | 10/1997 | Loomis | 342/357 |
| 4,899,296 A | 2/1990 | Khattak | 702/40 | 5,686,921 A | 11/1997 | Okada et al. | 342/127 |
| 4,910,526 A | 3/1990 | Donnangelo et al. | 342/455 | 5,694,322 A | 12/1997 | Westerlage et al. | 364/464.27 |
| 4,914,733 A | 4/1990 | Gralnick | 340/961 | 5,714,948 A | 2/1998 | Farmakis et al. | 340/961 |
| 4,958,306 A | 9/1990 | Powell et al. | 702/40 | 5,732,384 A | 3/1998 | Ellert et al. | 701/120 |
| 5,001,490 A | 3/1991 | Fichtner | 342/195 | 5,752,216 A | 5/1998 | Carlson et al. | 701/120 |
| 5,001,650 A | 3/1991 | Francis et al. | 364/516 | 5,757,314 A | 5/1998 | Gounon et al. | 342/357 |
| 5,017,930 A | 5/1991 | Stoltz | 342/465 | 5,774,829 A | 6/1998 | Cisneros et al. | 701/213 |
| 5,025,382 A | 6/1991 | Artz | 364/439 | 5,781,150 A | 7/1998 | Norris | 342/357 |
| 5,027,114 A | 6/1991 | Kawashima et al. | 340/941 | 5,784,022 A | 7/1998 | Kupfer | 342/80 |
| 5,045,861 A | 9/1991 | Duffett-Smith | 342/457 | 5,793,329 A | 8/1998 | Nakada et al. | 342/357 |
| 5,075,680 A | 12/1991 | Dabbs | 342/52 | 5,798,712 A | 8/1998 | Coquin | 340/970 |
| 5,075,694 A | 12/1991 | Donnangelo et al. | 342/455 | 5,802,542 A | 9/1998 | Coiera et al. | 711/4 |
| 5,081,457 A | 1/1992 | Motisher et al. | 342/40 | 5,825,021 A | 10/1998 | Uemura | 250/222.1 |
| 5,089,822 A | 2/1992 | Abauzna et al. | 342/30 | 5,828,333 A | 10/1998 | Richardson et al. | 342/70 |
| 5,113,193 A | 5/1992 | Powell et al. | 342/25 | 5,839,080 A | 11/1998 | Muller | 701/9 |
| 5,119,102 A | 6/1992 | Barnard | 342/357 | 5,841,391 A | 11/1998 | Lucas, Jr. et al. | 342/34 |
| 5,132,695 A | 7/1992 | Sumas et al. | 342/461 | 5,841,398 A | 11/1998 | Brock | 342/357 |
| 5,138,321 A | 8/1992 | Hammer | 342/36 | 5,850,420 A | 12/1998 | Guillard et al. | 375/316 |
| 5,144,315 A | 9/1992 | Schwab et al. | 342/49 | 5,867,804 A | 2/1999 | Pilley et al. | 701/120 |
| 5,153,836 A | 10/1992 | Fraughton et al. | 364/461 | 5,872,526 A | 2/1999 | Tognazzini | 340/961 |
| 5,179,384 A | 1/1993 | De Haan | 342/37 | 5,884,222 A | 3/1999 | Denoize et al. | 701/301 |
| 5,191,342 A | 3/1993 | Alsup et al. | 342/465 | 5,890,068 A | 3/1999 | Fattouce et al. | 455/456.2 |
| 5,200,902 A | 4/1993 | Pilley | 364/439 | 5,892,462 A | 4/1999 | Tran | 340/961 |
| 5,225,842 A | 7/1993 | Brown et al. | 342/357 | 5,913,912 A | 6/1999 | Nishimura et al. | 701/35 |
| 5,260,702 A | 11/1993 | Thompson | 340/970 | 5,920,277 A | 7/1999 | Foster et al. | 342/32 |
| 5,262,784 A | 11/1993 | Drobnicki et al. | 342/45 | 5,920,318 A | 7/1999 | Salvatore, Jr. et al. | 345/418 |
| 5,265,023 A | 11/1993 | Sokkappa | 364/439 | 5,923,293 A | 7/1999 | Smith et al. | 342/455 |
| 5,268,698 A | 12/1993 | Smith et al. | 342/450 | 5,949,375 A | 9/1999 | Ishiguro et al. | 342/457 |
| 5,283,574 A | 2/1994 | Grove | 340/970 | 5,969,674 A | 10/1999 | von der Embse et al. | 342/357.16 |
| 5,311,194 A | 5/1994 | Brown | 342/357 | 5,977,905 A | 11/1999 | Le Chevalier | 342/163 |
| 5,317,316 A | 5/1994 | Sturm et al. | 342/30 | 5,979,234 A | 11/1999 | Karlsen | 73/170.13 |
| 5,317,317 A | 5/1994 | Billaud et al. | 342/37 | 5,990,833 A | 11/1999 | Ahlbom et al. | 342/417 |
| 5,339,281 A | 8/1994 | Narendra et al. | 367/5 | 5,991,687 A | 11/1999 | Hale et al. | 701/207 |
| 5,341,139 A | 8/1994 | Billaud et al. | 342/40 | 5,995,040 A | 11/1999 | Issler et al. | 342/352 |
| 5,365,516 A | 11/1994 | Jandrell | 370/18 | 5,999,116 A | 12/1999 | Evers | 342/36 |
| 5,374,932 A | 12/1994 | Wyschogrod et al. | 342/36 | 6,043,777 A | 3/2000 | Bergman et al. | 342/357 |
| 5,379,224 A | 1/1995 | Brown et al. | 364/449 | 6,044,322 A | 3/2000 | Stieler | 701/120 |
| 5,381,140 A | 1/1995 | Kuroda et al. | 342/36 | 6,049,304 A | 4/2000 | Rudel et al. | 342/357.08 |
| 5,402,116 A | 3/1995 | Ashley | 340/870.1 | 6,049,754 A | 4/2000 | Beaton et al. | 701/204 |
| 5,406,288 A | 4/1995 | Billaud et al. | 342/37 | 6,075,479 A | 6/2000 | Kudoh | 342/70 |
| 5,424,746 A | 6/1995 | Schwab et al. | 342/49 | 6,081,222 A | 6/2000 | Henkel et al. | 342/45 |
| 5,424,748 A | 6/1995 | Pourailly et al. | 342/157 | 6,081,764 A | 6/2000 | Varon | 701/120 |
| 5,438,337 A | 8/1995 | Aguado | 342/357 | 6,085,150 A | 7/2000 | Henry et al. | 701/301 |
| 5,448,233 A | 9/1995 | Saban et al. | 340/963 | 6,088,634 A | 7/2000 | Muller | 701/9 |
| 5,450,329 A | 9/1995 | Tanner | 364/449 | 6,092,009 A | 7/2000 | Glover | 701/14 |
| 5,454,720 A | 10/1995 | FitzGerald et al. | 434/27 | 6,094,169 A | 7/2000 | Smith et al. | 342/465 |
| 5,455,586 A | 10/1995 | Barbier et al. | 342/37 | 6,122,570 A | 9/2000 | Muller | 701/9 |
| 5,471,657 A | 11/1995 | Gharpuray | 455/12.1 | 6,127,944 A | 10/2000 | Daly | 340/963 |
| 5,486,829 A | 1/1996 | Potier et al. | 342/40 | 6,133,867 A | 10/2000 | Eberwine et al. | 342/29 |
| 5,493,309 A | 2/1996 | Bjornholt | 342/455 | 6,138,060 A | 10/2000 | Conner | 701/9 |
| 5,506,590 A | 4/1996 | Minter | 342/462 | 6,147,748 A | 11/2000 | Hughes | 356/4.09 |
| 5,515,286 A | 5/1996 | Simon | 364/461 | 6,161,097 A | 12/2000 | Glass et al. | 705/6 |
| 5,528,244 A | 6/1996 | Schwab | 342/37 | 6,178,363 B1 | 1/2001 | McIntyre et al. | 701/16 |
| 5,534,871 A | 7/1996 | Hidaka et al. | 342/113 | 6,188,937 B1 | 2/2001 | Sherry et al. | 701/14 |
| 5,541,608 A | 7/1996 | Murphy et al. | 342/442 | 6,195,040 B1 | 2/2001 | Arethens | 342/357.12 |
| 5,570,095 A | 10/1996 | Drouilhet, Jr. et al. | 342/357 | 6,195,609 B1 | 2/2001 | Pilley | 701/120 |
| 5,570,099 A | 10/1996 | DesJardins | 342/378 | 6,201,499 B1 | 3/2001 | Hawkes et al. | 342/387 |
| 5,583,775 A | 12/1996 | Nobe et al. | 364/449.7 | 6,208,284 B1 | 3/2001 | Woodell et al. | 342/30 |
| 5,590,044 A | 12/1996 | Buckreub | 364/453 | 6,208,937 B1 | 3/2001 | Huddle | 701/221 |
| 5,596,326 A | 1/1997 | Fitts | 342/30 | 6,211,811 B1 | 4/2001 | Evers | 342/36 |
| 5,596,332 A | 1/1997 | Coles et al. | 342/455 | 6,219,592 B1 | 4/2001 | Muller et al. | 701/9 |
| 5,608,412 A | 3/1997 | Welles, II et al. | 342/457 | 6,222,480 B1 | 4/2001 | Kuntman et al. | 342/30 |
| 5,614,912 A | 3/1997 | Mitchell | 342/146 | 6,225,942 B1 | 5/2001 | Alon | 342/59 |
| 5,617,101 A | 4/1997 | Maine et al. | 342/358 | 6,230,018 B1 | 5/2001 | Watters et al. | 455/456 |
| 5,627,546 A | 5/1997 | Crow | 342/352 | 6,233,522 B1 | 5/2001 | Morici | 701/208 |
| 5,629,691 A | 5/1997 | Jain | 340/961 | 6,239,739 B1 | 5/2001 | Thomson et al. | 342/96 |
| 5,635,693 A | 6/1997 | Benson et al. | 235/384 | | | | |

| Patent No. | Date | Inventor | Class |
|---|---|---|---|
| 6,240,345 B1 | 5/2001 | Vesel | 701/31 |
| 6,246,342 B1 | 6/2001 | Vandevoorde et al. | 340/961 |
| 6,253,147 B1 | 6/2001 | Greenstein | 701/202 |
| 6,271,768 B1 | 8/2001 | Frazier, Jr. et al. | 340/961 |
| 6,275,172 B1 | 8/2001 | Curtis et al. | 340/961 |
| 6,275,767 B1 | 8/2001 | Delseny et al. | 701/120 |
| 6,282,487 B1 | 8/2001 | Shiomi et al. | 701/120 |
| 6,282,488 B1 | 8/2001 | Castor et al. | 701/120 |
| 6,289,280 B1 | 9/2001 | Fernandez-Corbaton | 701/214 |
| 6,292,721 B1 | 9/2001 | Conner et al. | 701/9 |
| 6,311,127 B1 | 10/2001 | Stratton et al. | 701/213 |
| 6,314,361 B1 | 11/2001 | Yu et al. | 701/120 |
| 6,314,363 B1 | 11/2001 | Pilley et al. | 701/120 |
| 6,317,663 B1 | 11/2001 | Meunier et al. | 701/16 |
| 6,321,091 B1 | 11/2001 | Holland | 455/456 |
| 6,327,471 B1 | 12/2001 | Song | 455/440 |
| 6,329,947 B2 | 12/2001 | Smith | 342/418 |
| 6,337,652 B1 | 1/2002 | Shiomi et al. | 342/37 |
| 6,338,011 B1 | 1/2002 | Furst et al. | 701/1 |
| 6,339,745 B1 | 1/2002 | Novik | 701/208 |
| 6,340,935 B1 | 1/2002 | Hall | 340/932.2 |
| 6,340,947 B1 | 1/2002 | Chang et al. | 342/357.01 |
| 6,344,820 B1 | 2/2002 | Shiomi et al. | 342/174 |
| 6,347,263 B1 | 2/2002 | Johnson et al. | 701/14 |
| 6,366,240 B1 | 4/2002 | Timothy et al. | 342/417 |
| 6,377,208 B2 | 4/2002 | Chang et al. | 342/357.01 |
| 6,380,869 B1 | 4/2002 | Simon et al. | 340/945 |
| 6,380,870 B1 | 4/2002 | Conner et al. | 340/970 |
| 6,384,783 B1 | 5/2002 | Smith et al. | 342/387 |
| 6,393,359 B1 | 5/2002 | Flynn et al. | 701/120 |
| 6,396,435 B1 | 5/2002 | Fleischhauer et al. | 342/70 |
| 6,408,233 B1 | 6/2002 | Solomon et al. | 701/35 |
| 6,414,629 B1 | 7/2002 | Curcio | 342/357.08 |
| 6,415,219 B1 | 7/2002 | Degodyuk | 70/117 |
| 6,420,993 B1 | 7/2002 | Varon | 342/36 |
| 6,445,310 B1 | 9/2002 | Bateman et al. | 340/970 |
| 6,445,927 B1 | 9/2002 | King et al. | 455/456 |
| 6,448,929 B1 | 9/2002 | Smith et al. | 342/456 |
| 6,459,411 B2 | 10/2002 | Frazier et al. | 342/455 |
| 6,462,674 B2 | 10/2002 | Ohmura et al. | 340/901 |
| 6,463,383 B1 | 10/2002 | Baiada et al. | 701/120 |
| 6,469,654 B1 | 10/2002 | Winner et al. | 342/33 |
| 6,469,655 B1 | 10/2002 | Franke et al. | 342/36 |
| 6,469,664 B1 | 10/2002 | Michaelson et al. | 342/357.13 |
| 6,473,027 B1 | 10/2002 | Alon | 342/37 |
| 6,473,694 B1 | 10/2002 | Akopian et al. | 701/213 |
| 6,477,449 B1 | 11/2002 | Conner et al. | 701/4 |
| 6,492,932 B1 | 12/2002 | Jin et al. | 342/25 |
| 6,493,610 B1 | 12/2002 | Ezaki | 701/3 |
| 6,504,490 B2 | 1/2003 | Mizushima | 340/943 |
| 6,518,916 B1 | 2/2003 | Ashihara et al. | 342/70 |
| 6,522,295 B2 | 2/2003 | Baugh et al. | 342/453 |
| 6,531,978 B2 | 3/2003 | Tran | 342/29 |
| 6,542,809 B2 | 4/2003 | Hehls, III | 701/120 |
| 6,542,810 B2 | 4/2003 | Lai | 701/120 |
| 6,545,631 B2 | 4/2003 | Hudson et al. | 342/30 |
| 6,549,829 B1 | 4/2003 | Anderson et al. | 701/16 |
| 6,563,432 B1 | 5/2003 | Millgard | 340/961 |
| 6,567,043 B2 | 5/2003 | Smith et al. | 342/450 |
| 6,571,155 B2 | 5/2003 | Carriker et al. | 701/3 |
| 6,584,400 B2 | 6/2003 | Beardsworth | 701/120 |
| 6,584,414 B1 | 6/2003 | Green et al. | 702/33 |
| 6,587,079 B1 | 7/2003 | Rickard et al. | 342/387 |
| 6,606,034 B1 | 8/2003 | Muller et al. | 340/970 |
| 6,615,648 B1 | 9/2003 | Ferguson et al. | 73/146 |
| 6,617,997 B2 | 9/2003 | Ybarra et al. | 342/29 |
| 6,618,008 B1 | 9/2003 | Scholz | 342/427 |
| 6,633,259 B1 | 10/2003 | Smith et al. | 342/456 |
| 6,657,578 B2 | 12/2003 | Stayton | 342/30 |
| 6,660,563 B1 | 12/2003 | Cromwell et al. | 701/301 |
| 6,680,687 B2 | 1/2004 | Phelipot | 342/29 |
| 6,690,295 B1 | 2/2004 | De Boer | 340/951 |
| 6,690,618 B2 | 2/2004 | Tomasi et al. | 367/127 |
| 6,691,004 B2 | 2/2004 | Johnson | 701/14 |
| 6,348,856 B1 | 3/2004 | Jones et al. | 340/10.1 |
| 6,707,394 B2 | 3/2004 | Ishihara et al. | 340/970 |
| 6,710,719 B1 | 3/2004 | Jones et al. | 340/825.49 |
| 6,710,723 B2 | 3/2004 | Muller | 340/970 |
| 6,714,782 B1 | 3/2004 | Monot et al. | 455/431 |
| 6,721,652 B1 | 4/2004 | Sanqunetti | 701/207 |
| 6,744,396 B2 | 6/2004 | Stone et al. | 342/36 |
| 6,750,815 B2 | 6/2004 | Michaelson et al. | 342/357.13 |
| 6,751,545 B2 | 6/2004 | Walter | 701/120 |
| 6,760,387 B2 | 7/2004 | Langford et al. | 375/267 |
| 6,765,533 B2 | 7/2004 | Szajnowski | 342/465 |
| 6,789,011 B2 | 9/2004 | Baiada et al. | 701/120 |
| 6,789,016 B2 | 9/2004 | Bayh et al. | 701/301 |
| 6,792,058 B1 | 9/2004 | Hershey et al. | 375/347 |
| 6,798,381 B2 | 9/2004 | Benner et al. | 342/450 |
| 6,799,114 B2 | 9/2004 | Etnyre | 701/120 |
| 6,801,152 B1 | 10/2004 | Rose | 342/13 |
| 6,801,155 B2 | 10/2004 | Jahangir et al. | 342/90 |
| 6,809,679 B2 | 10/2004 | LaFrey et al. | 342/37 |
| 6,810,329 B2 | 10/2004 | Koga | 701/211 |
| 6,812,890 B2 | 11/2004 | Smith et al. | 342/454 |
| 6,816,105 B2 | 11/2004 | Winner et al. | 342/37 |
| 6,819,282 B1 | 11/2004 | Galati et al. | 342/37 |
| 6,823,188 B1 | 11/2004 | Stern | 455/456.1 |
| 6,828,921 B2 | 12/2004 | Brown et al. | 340/945 |
| 6,845,362 B2 | 1/2005 | Furuta et al. | 705/13 |
| 6,861,982 B2 | 3/2005 | Forstrom et al. | 342/387 |
| 6,862,519 B2 | 3/2005 | Walter | 701/120 |
| 6,862,541 B2 | 3/2005 | Mizushima | 702/26 |
| 6,865,484 B2 | 3/2005 | Miyasaka et al. | 701/213 |
| 6,873,269 B2 | 3/2005 | Tran | 340/961 |
| 6,873,903 B2 | 3/2005 | Baiada et al. | 701/120 |
| 6,876,859 B2 | 4/2005 | Anderson et al. | 455/456.1 |
| 6,882,930 B2 | 4/2005 | Trayford et al. | 701/117 |
| 6,885,340 B2 | 4/2005 | Smith et al. | 342/465 |
| 6,900,760 B2 | 5/2005 | Groves | 342/357.14 |
| 6,912,461 B2 | 6/2005 | Poreda | 701/120 |
| 6,927,701 B2 | 8/2005 | Schmidt et al. | 340/959 |
| 6,930,638 B2 | 8/2005 | Lloyd et al. | 342/453 |
| 6,952,631 B2 | 10/2005 | Griffith et al. | 701/13 |
| 6,963,304 B2 | 11/2005 | Murphy | 342/357.02 |
| 6,967,616 B2 | 11/2005 | Etnyre | 342/182 |
| 6,977,612 B1 | 12/2005 | Bennett | 342/357.07 |
| 6,985,103 B2 | 1/2006 | Ridderheim et al. | 342/30 |
| 6,985,743 B2 | 1/2006 | Bajikar | 455/456.1 |
| 6,992,626 B2 | 1/2006 | Smith | 342/454 |
| 7,006,032 B2 | 2/2006 | King et al. | 342/29 |
| 7,026,987 B2 | 4/2006 | Lokshin et al. | 342/357.12 |
| 7,030,780 B2 | 4/2006 | Shiomi et al. | 340/961 |
| 7,043,355 B2 | 5/2006 | Lai | 701/120 |
| 7,050,909 B2 | 5/2006 | Nichols et al. | 701/301 |
| 7,053,792 B2 | 5/2006 | Aoki et al. | 340/928 |
| 7,058,506 B2 | 6/2006 | Kawase et al. | 701/201 |
| 7,062,381 B1 | 6/2006 | Rekow et al. | 701/300 |
| 7,065,443 B2 | 6/2006 | Flynn et al. | 701/120 |
| 7,071,843 B2 | 7/2006 | Hashida et al. | 340/995.12 |
| 7,071,867 B2 | 7/2006 | Wittenberg et al. | 342/70 |
| 7,079,925 B2 | 7/2006 | Kubota et al. | 701/1 |
| 7,095,360 B2 | 8/2006 | Kuji et al. | 342/29 |
| 7,102,552 B1 | 9/2006 | Archbold et al. | 340/945 |
| 7,102,570 B2 | 9/2006 | Bar-On et al. | 342/465 |
| 7,106,212 B2 | 9/2006 | Konishi et al. | 340/905 |
| 7,109,889 B2 | 9/2006 | He | 340/971 |
| 7,117,089 B2 | 10/2006 | Khatwa et al. | 701/301 |
| 7,120,537 B2 | 10/2006 | Flynn et al. | 701/120 |
| 7,123,169 B2 | 10/2006 | Farmer et al. | 340/945 |
| 7,123,192 B2 | 10/2006 | Smith et al. | 342/455 |
| 7,126,534 B2 | 10/2006 | Smith et al. | 342/456 |
| 7,136,059 B2 | 11/2006 | Kraud et al. | 345/419 |
| 7,142,154 B2 | 11/2006 | Quilter et al. | 342/357.06 |
| 7,148,816 B1 | 12/2006 | Carrico | 340/961 |
| 7,155,240 B2 | 12/2006 | Atkinson et al. | 455/456.2 |

| | | | |
|---|---|---|---|
| 7,164,986 B2 | 1/2007 | Humphries et al. ......... 701/207 |
| 7,170,441 B2 | 1/2007 | Perl et al. ..................... 342/29 |
| 7,170,820 B2 | 1/2007 | Szajnowski ................ 367/127 |
| 7,187,327 B2 | 3/2007 | Coluzzi et al. .............. 342/458 |
| 7,190,303 B2 | 3/2007 | Rowlan ....................... 342/29 |
| 7,196,621 B2 | 3/2007 | Kochis .................. 340/539.13 |
| 7,206,698 B2 | 4/2007 | Conner et al. ............... 701/301 |
| 7,218,276 B2 | 5/2007 | Teranishi .................. 342/357.1 |
| 7,218,278 B1 | 5/2007 | Arethens ............... 342/367.03 |
| 7,221,308 B2 | 5/2007 | Burton et al. ................. 342/42 |
| 7,228,207 B2 | 6/2007 | Clarke et al. ................... 701/3 |
| 7,233,545 B2 | 6/2007 | Harvey, Jr. et al. .......... 367/127 |
| 7,248,963 B2 | 7/2007 | Baiada et al. ................ 701/120 |
| 7,250,901 B2 | 7/2007 | Stephens ................... 342/146 |
| 7,257,469 B1 | 8/2007 | Pemble ........................... 701/3 |
| 7,272,495 B2 | 9/2007 | Coluzzi et al. .............. 701/207 |
| 7,277,052 B2 | 10/2007 | Delaveau et al. ............ 342/387 |
| 7,286,624 B2 | 10/2007 | Woo et al. ................... 375/356 |
| 7,307,578 B2 | 12/2007 | Blaskovich et al. ........... 342/29 |
| 7,308,343 B1 | 12/2007 | Horvath et al. ................. 701/3 |
| 7,321,813 B2 | 1/2008 | Meunier ....................... 701/10 |
| 7,333,052 B2 | 2/2008 | Maskell ....................... 342/195 |
| 7,333,887 B2 | 2/2008 | Baiada et al. ................ 701/120 |
| 7,352,318 B2 | 4/2008 | Osman et al. ................. 342/37 |
| 7,358,854 B2 | 4/2008 | Egner et al. ............ 340/539.13 |
| 7,379,165 B2 | 5/2008 | Anderson et al. .......... 356/5.05 |
| 7,382,286 B2 | 6/2008 | Cole et al. ................... 340/961 |
| 7,383,104 B2 | 6/2008 | Ishii et al. ....................... 701/3 |
| 7,383,124 B1 | 6/2008 | Vesel .......................... 701/200 |
| 7,385,527 B1 | 6/2008 | Clavier et al. .............. 340/945 |
| 7,391,359 B2 | 6/2008 | Ootomo et al. ............... 342/37 |
| 7,398,157 B2 | 7/2008 | Sigurdsson et al. ......... 701/213 |
| 7,400,297 B2 | 7/2008 | Ferreol et al. ............... 342/377 |
| 7,408,497 B2 | 8/2008 | Billaud et al. ................. 342/30 |
| 7,408,498 B2 | 8/2008 | Kuji et al. ...................... 342/37 |
| 7,420,501 B2 | 9/2008 | Perl ............................... 342/30 |
| 7,430,218 B2 | 9/2008 | Lee et al. .................... 370/464 |
| 7,437,225 B1 | 10/2008 | Rathinam .................... 701/14 |
| 7,440,846 B2 | 10/2008 | Irie et al. ..................... 701/200 |
| 7,457,690 B2 | 11/2008 | Wilson, Jr. ...................... 701/3 |
| 7,460,866 B2 | 12/2008 | Salkini et al. ............... 455/431 |
| 7,460,871 B2 | 12/2008 | Humphries et al. ....... 455/456.1 |
| 7,477,145 B2 | 1/2009 | Tatton et al. ................ 340/531 |
| 7,479,919 B2 | 1/2009 | Poe et al. ....................... 342/30 |
| 7,479,922 B2 | 1/2009 | Hunt et al. ............. 342/357.02 |
| 7,479,923 B2 | 1/2009 | Carpenter .............. 342/357.02 |
| 7,479,925 B2 | 1/2009 | Schell ......................... 342/455 |
| 7,487,108 B2 | 2/2009 | Aoki et al. ..................... 705/13 |
| 7,501,977 B2 | 3/2009 | Ino ............................... 342/37 |
| 7,504,996 B2 | 3/2009 | Martin .................. 342/357.12 |
| 7,515,715 B2 | 4/2009 | Olive .......................... 380/255 |
| 2001/0014847 A1 | 8/2001 | Keenan ....................... 701/117 |
| 2001/0026240 A1 | 10/2001 | Neher .................... 342/357.07 |
| 2002/0009267 A1 | 1/2002 | Shirakawa ...................... 701/4 |
| 2002/0021247 A1 | 2/2002 | Smith et al. ................. 342/450 |
| 2002/0089433 A1 | 7/2002 | Bateman et al. ............ 340/970 |
| 2002/0152029 A1 | 10/2002 | Sainthuile et al. ........... 701/301 |
| 2003/0004641 A1 | 1/2003 | Corwin et al. .............. 701/301 |
| 2003/0097216 A1 | 5/2003 | Etnyre ........................ 701/120 |
| 2003/0152248 A1 | 8/2003 | Spark et al. ................. 382/103 |
| 2003/0158799 A1 | 8/2003 | Kakihara et al. ............. 705/30 |
| 2004/0002886 A1 | 1/2004 | Dickerson et al. |
| 2004/0004554 A1 | 1/2004 | Srinivasan et al. ..... 340/870.01 |
| 2004/0039806 A1 | 2/2004 | Miras ......................... 709/223 |
| 2004/0044463 A1 | 3/2004 | Shing-Feng et al. ........ 701/120 |
| 2004/0086121 A1 | 5/2004 | Viggiano et al. ............ 380/255 |
| 2004/0094622 A1 | 5/2004 | Vismara ...................... 235/384 |
| 2004/0210371 A1 | 10/2004 | Adachi et al. ................. 701/50 |
| 2004/0225432 A1 | 11/2004 | Pilley et al. ................. 701/117 |
| 2004/0266341 A1 | 12/2004 | Teunon ...................... 455/12.1 |
| 2005/0007272 A1 | 1/2005 | Smith et al. ................. 342/189 |
| 2005/0021283 A1 | 1/2005 | Brinton et al. .............. 702/150 |
| 2005/0046569 A1 | 3/2005 | Spriggs et al. .............. 340/551 |
| 2005/0057395 A1 | 3/2005 | Atkinson |
| 2005/0159170 A1 | 7/2005 | Puranik et al. ........... 455/456.1 |
| 2005/0166672 A1 | 8/2005 | Atkinson ...................... 73/290 |
| 2005/0192717 A1 | 9/2005 | Tafs et al. ........................ 701/3 |
| 2005/0228715 A1 | 10/2005 | Hartig et al. ................... 705/13 |
| 2005/0231422 A1 | 10/2005 | Etnyre ........................ 342/182 |
| 2006/0023655 A1 | 2/2006 | Engel et al. ................. 370/328 |
| 2006/0044184 A1 | 3/2006 | Kimura .................. 342/357.09 |
| 2006/0052933 A1 | 3/2006 | Ota ............................ 701/200 |
| 2006/0119515 A1 | 6/2006 | Smith .......................... 342/450 |
| 2006/0129310 A1 | 6/2006 | Tarrant et al. ............... 701/201 |
| 2006/0161340 A1 | 7/2006 | Lee ............................. 701/207 |
| 2006/0167598 A1 | 7/2006 | Pennarola .................... 701/11 |
| 2006/0181447 A1 | 8/2006 | Kuji et al. ..................... 342/32 |
| 2006/0191326 A1 | 8/2006 | Smith et al. ..................... 73/73 |
| 2006/0208924 A1 | 9/2006 | Matalon ...................... 340/933 |
| 2006/0250305 A1 | 11/2006 | Coluzzi et al. .............. 342/458 |
| 2006/0262014 A1 | 11/2006 | Shemesh et al. ............ 342/386 |
| 2006/0265664 A1 | 11/2006 | Simons et al. .............. 715/722 |
| 2006/0276201 A1 | 12/2006 | Dupray ..................... 455/456.1 |
| 2007/0001903 A1 | 1/2007 | Smith et al. ................. 342/387 |
| 2007/0040734 A1 | 2/2007 | Evers .......................... 342/126 |
| 2007/0060079 A1 | 3/2007 | Nakagawa et al. .......... 455/131 |
| 2007/0090295 A1 | 4/2007 | Parkinson et al. ........... 250/349 |
| 2007/0106436 A1 | 5/2007 | Johansson ..................... 701/23 |
| 2007/0109184 A1 | 5/2007 | Shyr et al. .............. 342/357.06 |
| 2007/0159356 A1 | 7/2007 | Borel et al. ................. 340/945 |
| 2007/0159378 A1 | 7/2007 | Powers et al. ................. 342/29 |
| 2007/0182589 A1 | 8/2007 | Tran ............................ 340/961 |
| 2007/0213887 A1 | 9/2007 | Woodings ...................... 701/1 |
| 2007/0222665 A1 | 9/2007 | Koeneman .................... 342/29 |
| 2007/0250259 A1 | 10/2007 | Dare ........................... 701/201 |
| 2007/0252750 A1 | 11/2007 | Jean et al. ..................... 342/40 |
| 2007/0298786 A1 | 12/2007 | Meyers et al. ............... 455/431 |
| 2008/0027596 A1 | 1/2008 | Conner et al. ................. 701/16 |
| 2008/0042880 A1 | 2/2008 | Ramaiah et al. ............. 340/958 |
| 2008/0042902 A1 | 2/2008 | Brandwood et al. ......... 342/465 |
| 2008/0062011 A1 | 3/2008 | Butler et al. ................ 340/961 |
| 2008/0063123 A1 | 3/2008 | De Mey et al. ............. 375/350 |
| 2008/0068250 A1 | 3/2008 | Brandao et al. ............... 342/30 |
| 2008/0088508 A1 | 4/2008 | Smith ......................... 342/453 |
| 2008/0106438 A1 | 5/2008 | Clark et al. ................. 340/972 |
| 2008/0106457 A1 | 5/2008 | Bartolini et al. .............. 342/40 |
| 2008/0109343 A1 | 5/2008 | Robinson et al. ............. 705/37 |
| 2008/0117106 A1 | 5/2008 | Sarno et al. ................. 342/444 |
| 2008/0120032 A1 | 5/2008 | Brandao et al. ............. 701/300 |
| 2008/0129601 A1 | 6/2008 | Thomas ...................... 342/465 |
| 2008/0132270 A1 | 6/2008 | Basir ........................ 455/550.1 |
| 2008/0137524 A1 | 6/2008 | Anderson et al. ........... 370/203 |
| 2008/0150784 A1 | 6/2008 | Zhang et al. .................. 342/30 |
| 2008/0158040 A1 | 7/2008 | Stayton et al. ................ 342/32 |
| 2008/0158059 A1 | 7/2008 | Bull et al. .................... 342/387 |
| 2008/0174472 A1 | 7/2008 | Stone et al. ................... 342/30 |
| 2008/0183344 A1 | 7/2008 | Doyen et al. .................... 701/9 |
| 2008/0186224 A1 | 8/2008 | Ichiyanagi et al. .......... 342/109 |
| 2008/0186231 A1 | 8/2008 | Aljadeff et al. ............. 342/387 |
| 2008/0195309 A1 | 8/2008 | Prinzel, III et al. .......... 701/208 |
| 2008/0231494 A1 | 9/2008 | Galati ........................... 342/37 |
| 2008/0252528 A1 | 10/2008 | Shen et al. .................. 342/451 |
| 2008/0266166 A1 | 10/2008 | Schuchman ................... 342/97 |
| 2008/0272227 A1 | 11/2008 | Sharpe ....................... 244/3.16 |
| 2008/0275642 A1 | 11/2008 | Clark et al. ................. 701/208 |
| 2008/0294306 A1 | 11/2008 | Huynh et al. ................... 701/3 |
| 2008/0297398 A1 | 12/2008 | Kamimura .................... 342/38 |
| 2009/0005960 A1 | 1/2009 | Roberts et al. .............. 701/120 |
| 2009/0009357 A1 | 1/2009 | Heen et al. ............. 340/825.09 |
| 2009/0012660 A1 | 1/2009 | Roberts et al. .................. 701/3 |
| 2009/0012661 A1 | 1/2009 | Louis ............................. 701/9 |
| 2009/0015471 A1 | 1/2009 | Shen et al. .............. 342/357.15 |
| 2009/0027270 A1 | 1/2009 | Fisher et al. ................ 342/387 |
| 2009/0051570 A1 | 2/2009 | Clark et al. ................. 340/971 |

| | | | | | | |
|---|---|---|---|---|---|---|
| 2009/0055038 | A1 | 2/2009 | Garrec et al. ............ 701/17 | EP | 1361555 B1 | 5/2007 |
| | | | | EP | 1798572 A1 | 6/2007 |
| | FOREIGN PATENT DOCUMENTS | | | EP | 1410364 B1 | 10/2007 |
| DE | 4306660 A1 | 8/1974 | | EP | 1843161 A2 | 10/2007 |
| DE | 4204164 A1 | 8/1993 | | EP | 1860456 A1 | 11/2007 |
| DE | 19751092 A1 | 6/1999 | | EP | 1884462 A1 | 2/2008 |
| DE | 10149006 A1 | 4/2003 | | EP | 1101385 B1 | 3/2008 |
| DE | 202004007747 U1 | 9/2004 | | EP | 1901090 A1 | 3/2008 |
| DE | 202006005089 U1 | 6/2006 | | EP | 0964268 B1 | 4/2008 |
| DE | 102006009121 A1 | 8/2007 | | EP | 1483755 B1 | 4/2008 |
| EP | 0265902 A2 | 5/1988 | | EP | 1906204 A2 | 4/2008 |
| EP | 0346461 A1 | 12/1989 | | EP | 1912077 A2 | 4/2008 |
| EP | 0466239 | 1/1992 | | EP | 1331490 B1 | 6/2008 |
| EP | 0514826 A1 | 11/1992 | | EP | 1942351 A1 | 7/2008 |
| EP | 0550073 A2 | 7/1993 | | EP | 1327159 B1 | 8/2008 |
| EP | 0574009 A3 | 6/1994 | | EP | 1436641 B1 | 8/2008 |
| EP | 0613110 A1 | 8/1994 | | EP | 1953565 A1 | 8/2008 |
| EP | 0613111 A1 | 8/1994 | | EP | 1483902 B1 | 9/2008 |
| EP | 0614092 A1 | 9/1994 | | EP | 1965219 A1 | 9/2008 |
| EP | 0629877 A1 | 12/1994 | | EP | 1972962 A2 | 9/2008 |
| EP | 0355336 B1 | 8/1995 | | EP | 1975884 A1 | 10/2008 |
| EP | 0670566 A2 | 9/1995 | | EP | 1118011 B1 | 11/2008 |
| EP | 0682332 A1 | 11/1995 | | EP | 1995708 A1 | 11/2008 |
| EP | 0505827 B1 | 6/1996 | | EP | 2000778 A2 | 12/2008 |
| EP | 0385600 B1 | 7/1996 | | EP | 2001004 A2 | 12/2008 |
| EP | 0732596 A2 | 9/1996 | | EP | 2023155 A1 | 2/2009 |
| EP | 0487940 B1 | 1/1997 | | FR | 2708349 A1 | 2/1995 |
| EP | 0774148 A1 | 5/1997 | | FR | 2791778 A1 | 10/2000 |
| EP | 0578316 B1 | 4/1998 | | FR | 2881841 A1 | 8/2006 |
| EP | 0915349 A1 | 5/1999 | | JP | 9-288175 A | 11/1994 |
| EP | 1022580 A3 | 2/2001 | | JP | 6-342061 A | 12/1994 |
| EP | 1118871 A2 | 7/2001 | | JP | 8-146130 A | 5/1996 |
| EP | 0877997 B1 | 12/2001 | | JP | 9-119983 A | 11/1996 |
| EP | 0778470 B1 | 5/2002 | | WO | WO9205456 A1 | 4/1992 |
| EP | 1202233 A1 | 5/2002 | | WO | WO 94/14251 | 6/1994 |
| EP | 0865004 B1 | 7/2002 | | WO | WO9427161 A1 | 11/1994 |
| EP | 1109032 B1 | 3/2003 | | WO | WO9428437 A1 | 12/1994 |
| EP | 1300689 A2 | 4/2003 | | WO | WO9503598 A1 | 2/1995 |
| EP | 1331620 A1 | 7/2003 | | WO | WO9521388 A1 | 8/1995 |
| EP | 1345044 A1 | 9/2003 | | WO | WO9605562 A1 | 2/1996 |
| EP | 1369704 A1 | 12/2003 | | WO | WO9635961 A1 | 11/1996 |
| EP | 1302920 B1 | 2/2004 | | WO | WO9726552 A2 | 7/1997 |
| EP | 1396832 A1 | 3/2004 | | WO | WO9747173 A2 | 12/1997 |
| EP | 1406228 A2 | 4/2004 | | WO | WO9804965 A2 | 2/1998 |
| EP | 1070968 B1 | 5/2004 | | WO | WO9805977 A1 | 2/1998 |
| EP | 1431946 A1 | 6/2004 | | WO | WO9814926 A1 | 4/1998 |
| EP | 1467575 A1 | 10/2004 | | WO | WO9822834 A1 | 5/1998 |
| EP | 1471365 | 10/2004 | | WO | WO9822923 A1 | 5/1998 |
| EP | 0903589 B1 | 11/2004 | | WO | WO9835311 A1 | 8/1998 |
| EP | 1517281 A2 | 3/2005 | | WO | WO9843107 A1 | 10/1998 |
| EP | 1531340 A1 | 5/2005 | | WO | WO9849654 A1 | 11/1998 |
| EP | 0926510 B1 | 8/2005 | | WO | WO9908251 A1 | 2/1999 |
| EP | 1405286 B1 | 9/2005 | | WO | WO9935630 A1 | 7/1999 |
| EP | 1485730 B1 | 9/2005 | | WO | WO9942855 A1 | 8/1999 |
| EP | 1428195 B1 | 10/2005 | | WO | WO9945519 A2 | 9/1999 |
| EP | 1603098 A1 | 12/2005 | | WO | WO 99/50985 | 10/1999 |
| EP | 1125415 B1 | 1/2006 | | WO | WO9956144 A1 | 11/1999 |
| EP | 1205732 B1 | 3/2006 | | WO | WO0023816 A1 | 4/2000 |
| EP | 1632787 A1 | 3/2006 | | WO | WO0039775 A2 | 7/2000 |
| EP | 1632892 A2 | 3/2006 | | WO | WO0111389 A1 | 2/2001 |
| EP | 0953261 B1 | 6/2006 | | WO | WO0133302 A2 | 5/2001 |
| EP | 1275975 B1 | 6/2006 | | WO | WO0148652 A1 | 7/2001 |
| EP | 1285232 B1 | 6/2006 | | WO | WO0157550 A1 | 8/2001 |
| EP | 1672384 A2 | 6/2006 | | WO | WO0159601 A1 | 8/2001 |
| EP | 0987562 B1 | 7/2006 | | WO | WO0163239 A1 | 8/2001 |
| EP | 1093564 B1 | 11/2006 | | WO | WO0165276 A1 | 9/2001 |
| EP | 1218694 B1 | 11/2006 | | WO | WO 0186319 | 11/2001 |
| EP | 1727094 A2 | 11/2006 | | WO | WO0194969 A2 | 12/2001 |
| EP | 1742170 A1 | 1/2007 | | WO | WO0205245 A2 | 1/2002 |
| EP | 1188137 B1 | 2/2007 | | WO | WO0208784 A1 | 1/2002 |
| EP | 1755356 A1 | 2/2007 | | WO | WO0215151 A2 | 2/2002 |
| EP | 1463002 B1 | 4/2007 | | WO | WO0227275 A2 | 4/2002 |
| | | | | WO | WO02054103 A2 | 7/2002 |

| | | |
|---|---|---|
| WO | WO02059838 A2 | 8/2002 |
| WO | WO02066288 A1 | 8/2002 |
| WO | WO02069300 A1 | 9/2002 |
| WO | WO02075667 A1 | 9/2002 |
| WO | WO02091312 A2 | 11/2002 |
| WO | WO02095709 A2 | 11/2002 |
| WO | WO02099769 | 12/2002 |
| WO | WO03013010 A1 | 2/2003 |
| WO | WO03016937 A1 | 2/2003 |
| WO | WO03023439 A2 | 3/2003 |
| WO | WO03027934 A1 | 4/2003 |
| WO | WO03054830 A2 | 7/2003 |
| WO | WO03056495 A1 | 7/2003 |
| WO | WO03060855 A1 | 7/2003 |
| WO | WO03067281 A1 | 8/2003 |
| WO | WO03079136 A2 | 9/2003 |
| WO | WO03081560 A1 | 10/2003 |
| WO | WO03093775 A2 | 11/2003 |
| WO | WO03096282 A1 | 11/2003 |
| WO | WO03098576 A1 | 11/2003 |
| WO | WO03107299 A2 | 12/2003 |
| WO | WO2004042418 A1 | 5/2004 |
| WO | WO2004068162 A2 | 8/2004 |
| WO | WO2004109317 A2 | 12/2004 |
| WO | WO2004114252 A1 | 12/2004 |
| WO | WO2005038478 A2 | 4/2005 |
| WO | WO2005052887 A1 | 6/2005 |
| WO | WO2005081012 A1 | 9/2005 |
| WO | WO2005081630 A2 | 9/2005 |
| WO | WO2005114613 A1 | 12/2005 |
| WO | WO2005121701 A2 | 12/2005 |
| WO | WO2005017555 A2 | 5/2006 |
| WO | WO2006070207 A1 | 7/2006 |
| WO | WO2006079165 A1 | 8/2006 |
| WO | WO2006093682 A2 | 9/2006 |
| WO | WO2006108275 A1 | 10/2006 |
| WO | WO2006110973 A1 | 10/2006 |
| WO | WO2006135916 A1 | 12/2006 |
| WO | WO2006135923 A2 | 12/2006 |
| WO | WO2007001660 A2 | 1/2007 |
| WO | WO2007010116 A1 | 1/2007 |
| WO | WO2007012888 A1 | 2/2007 |
| WO | WO2007013069 A1 | 2/2007 |
| WO | WO2007048237 A1 | 5/2007 |
| WO | WO2007086899 A2 | 8/2007 |
| WO | WO2006088554 A1 | 9/2007 |
| WO | WO2007113469 A1 | 10/2007 |
| WO | WO2007115246 A1 | 10/2007 |
| WO | WO2007120588 A2 | 10/2007 |
| WO | WO2007124300 A2 | 11/2007 |
| WO | WO2008001117 A1 | 1/2008 |
| WO | WO2008005012 A1 | 1/2008 |
| WO | WO2008012377 A1 | 1/2008 |
| WO | WO2008018088 A1 | 2/2008 |
| WO | WO2008051292 A2 | 5/2008 |
| WO | WO2008053173 A1 | 5/2008 |
| WO | WO2008065328 A2 | 6/2008 |
| WO | WO2008065658 A1 | 6/2008 |
| WO | WO2008068679 A1 | 6/2008 |
| WO | WO2008093036 A2 | 8/2008 |
| WO | WO2008116580 A1 | 10/2008 |
| WO | WO2008126126 A2 | 10/2008 |
| WO | WO2008144784 A1 | 12/2008 |
| WO | WO2008145946 A2 | 12/2008 |
| WO | WO2009001294 A2 | 12/2008 |
| WO | WO2009004381 A1 | 1/2009 |

OTHER PUBLICATIONS

Traffic Alert System Technical Design Summary, Final Report, Apr. 1994 (Baldwin et al.).

GPS Relative Accuracy for Collision Avoidance, Institute of Navigation Technical Meeting, Jan. 1997 (Rudel et al.).

Cassell, R., Smith A., Cohen, B., Yang, E., Sleep, B., A Prototype Aircraft Performance Risk Assessment Model, Final Report, Rannoch Corporation, Feb. 28, 2002.

Cassell, R., Smith A., Cohen, B., Yang, E., Sleep, B., Esche, J., Aircraft Performance Risk Assessment Model (APRAM), Rannoch Corporation, Nov. 30, 2002.

Cox, E., A., Fuzzy Logic For Business and Industry, Charles River Media, 1995, Chapter 5.

Smith, A., Cassell, R., Cohen, B., An approach to Aircraft Performance Risk Assessment Modeling, Final Report, Rannoch Corporation, Mar. 1999.

M.L. Wood and R. W. Bush, "Multilateration on Mode S and ATCRBS Signals at Atlanta's Hartsfield Airport", Lincoln Laboratory, M.I.T., Jan. 8, 1998.

AERMOD: Description of Model Formulation (Version 02222) EPA 454/R-02-002d, Oct. 21, 2002.

FAA Integrated Noise Model, www.faa.gov, current release INM 6.1 (Mar. 4, 2003).

"Flight Explorer News: Flight Explorer and Lochard Team to Provide Enhanced Flight Tracking for Cutomers Worldwide", Apr. 28, 2003, http://www.flightexplorer/com/News/press%20releases/pr042803. asp.

Source Code received by Rannoch Corp. from FAA, circa 1998.

"A Routine that converts an American Mode S address into its corresponding 'N' number string", Ken Banis, Feb. 17, 1992/.

"Description of the U.S. Algorithm for Assigning Mode A Addresses", Robert D. Grappel, M.I.T. Lincoln Laboratory, Nov. 1991.

"Program to convert Mode S address to U.S. Tail Number", R.D. Grappel, M.I.T. Lincoln Laboratory, 1991.

"Program to convert U.S. aircraft tail numbers to Mode S code", R.D. Grappel, M.I.T. Lincoln Laboratory, 1991.

"ADSE and Multilateration Mode-S Data Fusion for Location and Identification on Airport Surface", J.G. Herraro J.A. Portas, F.J. Rodriguez,(*IEEE 1999 Radar Conference Proceedings*, pp. 315-320, Apr. 20-22, 1999).

D.C. Rickard, D.J.Sherry, S.J.Taylor, "The development of a prototype aircraft-height monitoring unit utilising an SSR-based difference in time of arrival technique", International Conference Radar 92 (Conf. Publ. No. 365), 1992, p. 250-3.

D. E. Manolakis and C. C. Lefas, "Aircraft geometric height computation using secondary surveillance radar range differences," IEE Proceedings-F, Radar, Sonar, Navigation, vol. 141, No. 2, pp. 139-148, 1994.

Request for Proposal for Acquisition of Airport Noise and Operations Monitoring System (NOMS), Indianapolis Airport Authority, Oct. 21, 2003.

Technical Specifications, for Aircraft Flight Track and Noise Management System for the Regional Airport Authority of Louisville and Jefferson County, Harris Miller, Miller & Hanson Inc. 15 New England Executive Park Burlington, MA 01803 HMMH Report No. 298950, May 16, 2003.

"Overview of the FAA ADS-B Link Decision", John Scardina, Director, Office of System Architecture and Investment Analysis, Federal Aviation Administration, Jun. 7, 2002.

"Ground-Based Transceiver (GBT) for Broadcast Services Using the Universal Access Transceiver (UAT) Data Link", FAA-E-2973, Department of Transportation, Federal Aviation Administration, Jan. 15, 2004.

"Wide Area Multilateration Report on EATMP TRS 131/04 Version 1.1", NLR-CR-2004-472, Roke Manor, Nov. 2004.

J.G. Herrero, J. A. B. Portas, F.J.J. Rodriguez, J.R.C. Corredera, ASDE and Multilateration Mode-S Data Fusion for Location and Identification on Airport Surface, (*IEEE 1999 Radar Conf. Proc.*, pp. 315-320, Apr. 20-22, 1999).

D.C. Rickard, D.J. Sherry, S.J. Taylor, The development of a prototype aircraft-height monitoring unit utilizing an SSR-based difference in time of arrival technique, Int'l Conference Radar 92 (Conf. Publ. No. 365), 1992, p. 250-3.

D. E. Manolakis and C. C. Lefas, Aircraft geometric height computation using secondary surveillance radar range differences, IEE Proceedings-F, Radar, Sonar, Navigation, vol. 141, No. 2, pp. 139-148, 1994.

GPS Risk Assessment Study, Final Report, T.M. Corrigan et al., Johns Hopkins Univ., Applied Physics Laboratory, Jan. 1999.
Aircraft Noise Report, vol. 17, No. 1, Jan. 31, 200.
ASA MASPS—Change Issue, James Maynard, Oct. 21, 2002.
ADS-B, Automatic Dependent Surveillance—Broadcast Will ADS-B Increase Safety and Security for Aviation?, Mar. 1999, revised Jul. 2000, Darryl H. Phillips AirSport Corporation, 1100 West Cherokee Sallisaw OK 74955.
ASA MASPS—Change Issue, Greg Stayton, Aug. 1, 2002.
ASA MASPS—Change Issue, Michael Petri, Oct. 23, 2002.
ASA MASPS—Change Issue, J. Stuart Searight, Nov. 18, 2002.
ASA MASPS—Change Issue, Michael Petri, Dec. 16, 2002.
ASA MASPS—Change Issue, J. Stuart Searight, Jan. 23, 2003.
ASA MASPS—Change Issue, Tony Warren, Feb. 3, 2003.
ASA MASPS—Change Issue, Steve George, Apr. 23, 2003.
ASA MASPS—Change Issue, James Maynard, Apr. 23, 2003.
ASA MASPS—Change Issue, T.E. Foster, Jun. 11, 2003.
ASA MASPS—Change Issue, Jonathan Hammer et al., Jan. 13, 2004.
ASA MASPS—Change Issue, Tom Mosher, Jan. 13, 2004.
ASA MAPS—Change Issue, Mike Castle, Feb. 13, 2004.
ASA MASPS—Change Issue, Tony Warren, Sep. 10, 2004.
ASA MASPS—Change Issue, Mike Castle, Sep. 10, 2004.
ASA MASPS—Change Issue, Bob Smith, Sep. 1, 2004.
ASA MASPS—Change Issue, Heleberg and Kaliardos, Oct. 15, 2004.
ASA MASPS—Change Issue, Taji Shafaat, Sep. 19, 2004.
ASA MASPS—Change Issue, Stuart Searight, Nov. 3, 2004.
A Radar Substitute—David Hughes, Aviation Week & Space Technology, Mar. 7, 2005.
Statement of ACI-NA and AAAE on Airport Improvement Program Reauthorization before the Senate Aviation Subcommittee on Feb. 12, 1998. David Plavin.
Draft Proposal for the Amendment of the Sub-Cap on Off-Peak Takeoff and Landing Charges at Dublin Airport, Commission for Aviation Regulation, Nov. 23, 2003.
Aviation Infrastructure: Challenges Associated with Building and Maintaining Runways, General Accounting Office, GAO-01-90-T, Oct. 5, 2000.
Airfield Pavement: Keeping Nations Runways in Good Condition Could Require Substantially higher Spending, GAO/RCED-98-226, Jul. 1998.
Albany International Airport Pavement Management System, Albany, New York, Albany International Airport GIS-Based Pavement and Facilities Management , Fall, 2002.
Albany International Airport, New York, Uses GIS for Pavement Management, Lena Weber, Ph.D., GIS Manager, and Pat Rooney, GIS/GPS Technician, C.T. Male Associates, Summer, 2002, http://www.esri.com/news/arcnews/summer02articles/albany-airport.html.
Micropaver, Dr. M.Y. Shahin, CECER-CFF Champaign, IL May 2, 2005.
Raytheon Systems Limited Launches a Unique Solution for ADS-B,. Jan. 19, 2005, Raytheon Corp. http://www.raytheon.co.uk/highlights/ATMS.html.
Raytheon Systems Limited's ADS-B Solution Prized by International Air Traffic Authorities, Feb. 2, 2005, http://www.raytheon.co.uk/news_room/news/press_02022005.pdf.
Boeing Subsidiary and Megadata Announce Joint Marketing Agreement, Press Release, Aug. 7, 2003.
Federal Airways & Airspace, Inc. Because Accuracy Matters, Feb. 2003, Jan. 2002.
VDL4 TM Alignment With DO-242A (RTCA ADS-B MASPS) WG51/SG2, NASA, Sep. 2003.
Method to Provide System-Wide ADS-B Back-Up, Validation, and Security, A. Smith et al. 25th AIAA/IEEE Digital Avionics Systems Conference, Oct. 15, 2006.
*Positive Identification of Aircraft on Surface Movement Area—Results of FAA Trials*, 10th Annual International AeroSense Symposium, Orlando, Florida, Apr. 1996.
*Surveillance Monitoring of Parallel Precision Approaches in a Free Flight Environment*, AIAA 16th Annual Digital Avionics Systems Conference, Oct. 1997.

*Analysis of ADS-B, ASDE-3 and Multilateration Surveillance Performance*—NASA Atlanta Demonstration Presented at the AIAA 17th Annual Digital Avionics Systems Conference in Oct. 1998.
*Application of ADS-B for Airport Surface Surveillance*, Daniel Hicok, Derrick Lee IEEE AIAA 17th Annual Digital Avionics Conference, 1998.
*Atlanta Hartsfield International Airport—Results of FAA Trials to Accurately Locate/Identify Aircraft on the Airport Movement Area*, IEEE Plans, Atlanta, GA, Apr. 1996.
*Evaluation of Airport Surface Surveillance Technologies*, IEEE Radar 96 conference, Beijing, China, Oct. 1996.
*Improved Location/Identification of Aircraft/Ground Vehicles on Airport Movement Areas—Results of FAA Trials*, Institute of Navigation in Santa Monica, CA, Jan. 1996.
*Sensis News*, http://www.sensis.com/docs/128/ © 1999-2006.
*Roke Radar, Design and development of miniature radars and fuze sensors through to major radar programme builds*, http://www.roke.co.uk/skills/radar/, © 2006.
*Acoustic System for Aircraft Detection and Tracking, based on Passive Microphone Arrays*. Caronna, Rosello, Testa, 148th Meeting of the Acoustical Society of America, http://pcfite.ing.uniroma1.it/upload/research/4psp71107948 2021710.pdf Nov. 2004.
*Cel-Loc How We Do it, Technology Overview*, http://www.cell-loc.com/how_tech.html, Oct. 2, 2006 (original date unknown).
*Super-Radar, Done Dirt Cheap*, http://www.businessweek.com/magazine/content/03_42/b3854113.htm BusinessWeek Online, Oct. 20, 2003.
*Methods to Provide System-Wide ADS-B Back-Up, Validation and Security*, A. Smith, R. Cassell, T. Breen, R. Hulstrom, C. Evers, 25th AIAA/IEEE Digital Avionics Systems Conference, Oct. 15, 2006.
Damarel Systems International, LTD, Travel Automation Specialists, © 2004, www.dameral.com.
Airfield Pavement Computer Software, Mar. 23, 2005, Transport Canada https://www.tc.gc.ca/CivilAviation/International/Technical/Pavement/software.htm.
ARA Transportation, © 2004, http://www.araworldwide.com/expertise/industry/transportation.htm.
*The Twilight Zone, Can Wide-Area Multilateration Systems Become a Nightmare for MSSR Producers?* Aircraft Traffic Technology International 2005, Vladimir Manda, Viktor Sotona.
*Safety, Performance, and Interoperability Requirements Document for ADS-B NRA Application*, European Organisation for Civil Avaiation Equipment, Dec. 2005.
Passive Surveillance Using Multilateration, Roke Manor Research website (2003).
Letter from Marc Morgan, SIEMENS, Feb. 10, 2006.
*Required Navigation Performance (RNP) and Area Navigation (RNAV)*, Boeing, Aug. 2000.
*System-Wide ADS-B Back-Up and Validation*, A. Smith, R. Cassell, T. Breen, R. Hulstrom, C. Evers, 2006 Integrated Communications, Navigation, and Surveillance Conference.
Required Navigation Performance (RNP) Another step towards global implementation of CNS/ATM, Anita Trotter-Cox, Assessment Compliance Group, Inc. Published in Professional Pilot Magazine, Jun. 1999.
Airport Pavement Management Systems: An Appraisal of Erxisting Methodologies, Michel Gendreau and Patrrick Soriano;Pergamon Transn Res. A, vol. 32, No. 3, pp. 187-214, 1998.
*Components of a Pavement Maintenance Management System*, Mohamed Y. Shahin, U.S. Army Construction Engineering Research Laboratory, Transportaiton Research Record 791, pp. 31-39, 1980.
*Application of Markov Process to Pavement Management Systems at the Network Level*, Abbas Ahmad Butt, University of Iillinois at Urbana-Champaign (1991).
Need for Accurate Traffic Data in Pavement Management, John F. Kennedy International Airport Case Studt, Keegan, Handojo, Rada, MACTEX Engineering and Consulting, Inc, 2004 FAA Worldwide Airport Technology Transfer Conference, Apr. 2004.
PCL system with illuminator of opportunity, Huaiying tan, Min ren, Bo lie, Jinning Song, Beijing Radar Instiitute, IEEE 0-7803-9582-4/06, Apr. 2006.
High Accurate Multiple Target Detection in PCL Radar Systems; Jafargholi, A. Mousavi, M. R. Nayebi, M. M. K. N. Toosi University of Technology Department of Electrical Engineering, Tehran, Iran; Radar, 2006. CIE '06. International Conference on, Oct. 2006, Shanghai, China; ISBN: 0-7803-9583-2.

Denial of bistatic hosting by spatial-temporal waveform design; H.D. Griffiths, M.C. Wicks, D. Weinder, R. Adve, P.A. Antonik, and I. Fotinopoulos, IEE Proc. Radar Sonar Navig., vol. 152, No. 2, Apr. 2005.

Passive coherent location FPGA implementation of the cross ambiguity function; Kvasnicka, M. Hermanek, A. Kunes, M. Pelant, M. Plsek, R., Proceedings- SPIE The International Society for Optical Engineering; 2006, vol. 6159; Part 1, pp. 615918; International Society for Optical Engineering.

Passive coherent location system simulation and evaluation, Proc. SPIE, vol. 6159, 615917 (2006); DOI:10.1117/12.675065, Apr. 26, 2006; Conference Title: Photonics Applications in Astronomy, Communications, Industry, and High-Energy Physics Experiments IV Libor Slezák, Michael Kvasnicka, Martin Pelant, and Jit Vavra *ERA a.s.* (Czech Republic) Radek Plsek *Technical Univ. of Pardubice* (Czech Republic).

World Airport Week, "Sharing Makes the Airport Go Round" Jan. 21, 1997, p. 1.

Huaiying Tan et al. *PCL System With Illuminator of Opportunity* Proceedings of 2006 CIE International Conference on Radar, vol. 1,Oct. 16, 2006.

Griffiths H D et al., *Denial of Bistatic Hosting By Spatial-Temporal Waveform Design* IEE Proceedings: Radar, Sonar & Navigation, Institution of Electrical Engineers, GB, vol. 152, No. 2, Apr. 8, 2005.

Jafargholi et al, *High Accurate Multiple Target Detection in PCL Radar Systems*, Radar, 2006, CIE '06. International Conference on, IEEE, PI, Oct. 1, 2006.

Protest Letter dated May 16, 2002 from Otto M. Wildensteiner, U.S. Department of Transportation, Washington, DC.

"Comparison of Claims in U.S. Appl. No. 09/971,672 with Prior Art", May 16, 2002, Otto M. Wildensteiner, Department of Transportation, Washington, DC.

"Minimum Aviation System Performance Standards for Automatic Dependent Surveillance Broadcast (ADS-B)", RCTA, Inc. Washington, DC, Aug. 1998.

"Runway Incursion Reduction Program Dallas-Ft. Worth Formal Evaluation Report, Final Report", Trios Associates, Inc. Dec. 21, 2000.

"TIS-B DFW Application for Airport Surface Situational Awareness", Trios Associates, Inc., Sep. 6, 2000.

"A Prototype Transceiver for Evaluating An Integrated Broadcast Data Link Architecture", Chris Moody & Warrent Wilson, RCTA SC-186, Aug. 17, 1995, RTCA Paper No. 449-95/SC186-033.

"The Universal Access Transceiver (UAT)", Warren Wilson & Chris Moody, May 10, 1995.

"Terminal Area Productivity (TAP) Study Low Visibility Landing and Surface Operations (LVLASO) Demonstration Report" Surface Surveillance Products Team (AND-410) Sep. 4, 1998.

"Phase I—Operational Evaluation Final Report Cargo Airline Association ADS-B Program, FAA SafeFlight 21 Program" Apr. 10, 2000.

"Capstone Program Plan Version 1.0", Federal Aviation Administration, Mar. 10, 1999.

"TIS-B Concept and Approach", MITRE, Chris Moody, Feb. 29, 2000.

"RTCA Special Committee 186, Working Group 5 ADS-B UAT MOPS Meeting #2, Proposed Contents and Transmission Rates for ADS-B Messages" Chris Moody, MITRE Corp., Feb. 20, 2001.

"Airborne Information Initiatives: Capitalizing on a Multi-Purpose Broadcast Communications Architecture", R.C. Strain, J.C. Moody, E.C. Hahn, B.E. Dunbar, S. Kavoussi, J.P. Mittelman, Digital Avionics Systems Conference, Oct. 1995.

"Minutes of SC-186 WG-2 (TIS-B) Meeting", Jun. 13-14, 2000.

Terminal, Landing Fees Increase, Dianne Gouliquer, Northern Ontario Business, Sudbury, Apr. 1, 2001, vol. 21, Issue 6, p. 24.

Conflict Detection and Resolution for Future Air Transport Management, Jimmy Krozel, Ph.D, Mark E. Peters, and George Hunter, TR 97138-01, NASA Ames Research Center, Contract NAS2-14285, Apr. 1997.

ADS-X—Next Generation Surveillance Solutions, Alex Smith, Russell Hulstron, Rannoch Corporation, ATCA Oct. 2006.

Transtech Airport Solutions, Inc., http://www.transtech-solutions.com/products/asm/airport.html, Feb. 12, 2009.

Eurocontrol Standard Document for Surveillance Interchange Part 14: Category 020, Multilateration Target Reports, SUR.ET1.ST05.2000-STD-14-02, Apr. 2008.

ATO Advanced Technology Development and Prototyping Group, http://222.faa.gov/about/office_org/headquarters_offices/ato/service_units/operations/td/.. Jan. 16, 2008.

Form B- Proposal Summary, NASA SBIR 02-1 Solicitation, http://sbir.nasa.gov/SBIR/abstracts/02/sbir/phase1/SBIR-02-1-A3.01-9714.html Sep. 5, 2002.

Form 9B—Project Summary, NASA SBIR 00-1 Soliciation http://sbir.nasa.gov/SBIR/abstracts/00/sbir/phase1/SBIR-00-1-04.01-9704.html Feb. 12, 2009.

NASA 1998 SBIR Phase 1, Proposal No. 91-1 01.02-9780B (1998) http://sbir.nasa.gov/SBIR/abstracts/98/sbir/phase1/SBIR-98-1-01.02-9780B.html.

ADS-X—Next Generation Surveillance Solutions, Alex Smith, Russell Hulstron, Rannoch Corporation, ATCA Oct. 2006.

Transtech Airport Solutions, Inc., http://www.transtech-solutions.com/products/asm/airport.html, Feb. 12, 2009.

Eurocontrol Standard Document for Surveillance Interchange Part 14: Category 020, Multilateration Target Reports, SUR.ET1.ST05.2000-STD-14-02, Apr. 2008.

ATO Advanced Technology Development and Prototyping Group, http://222.faa.gov/about/office_org/headquarters_offices/ato/service_units/operations/td/.. Jan. 16, 2008.

Form B- Proposal Summary, NASA SBIR 02-1 Solicitation, http://sbir.nasa.gov/SBIR/abstracts/02/sbir/phase1/SBIR-02-1-A3.01-9714.html Sep. 5, 2002.

Form 9B—Project Summary, NASA SBIR 00-1 Soliciation http://sbir.nasa.gov/SBIR/abstracts/00/sbir/phase1/SBIR-00-1-04.01-9704.html Feb. 12, 2009.

NASA 1998 SBIR Phase 1, Proposal No. 91-1 01.02-9780B (1998) http://sbir.nasa.gov/SBIR/abstracts/98/sbir/phase1/SBIR-98-1-01.02-9780B.html.

"UK ADS-B in radar environment" (Mark Watson) http://www.eurocontrol.int/cascade/gallery/content/public/documents/Presentations/Session%20%202%20-%20Trials%20and%20Implementations/Watson%20-%20UK%20ADS-B%20in%20a%20radar%20environment.pdf (2006).

Ground Vehicle Operations on Airports, FAA Advisory Circular AC No. 150/5210-20 Jun. 21, 2002.

*Primary Examiner*—Dao L Phan

(57) ABSTRACT

Multilateration techniques are used to provide accurate aircraft tracking data for aircraft on the ground and in the vicinity of an airport. From this data, aircraft noise and operations management may be enhanced. Aircraft noise may be calculated virtually using track data in real-time and provided to a user to determine noise violations. Tracking data may be used to control noise monitoring stations to gate out ambient noise. Aircraft emissions, both on the ground and in the air may be determined using tracking data. This and other data may be displayed in real time or generated in reports, and/or may be displayed on a website for viewing by airport operators and/or members of the public. The system may be readily installed in a compact package using a plurality of receivers and sensor packages located at shared wireless communication towers near an airport, and a central processing station located in or near the airport.

14 Claims, 9 Drawing Sheets

MULTILATERATION ENHANCEMENTS FOR NOISE AND OPERATIONS MANAGEMENT

CROSS REFERENCE TO RELATED APPLICATIONS

The present application is a Divisional of U.S. patent application Ser. No. 11/342,289, filed on Jan. 28, 2006, and incorporated herein by reference; application Ser. No. 11/342,289 is a Continuation-In-Part of U.S. patent application Ser. No. 11/209,030, filed on Aug. 22, 2005, and incorporated herein by reference; application Ser. No. 11/209,030 is a Continuation-In-Part of U.S. patent application Ser. No. 10/830,444, filed on Apr. 23, 2004, and incorporated herein by reference; application Ser. No. 10/830,444 is a Continuation-In-Part of U.S. patent application Ser. No. 10/457,439 filed on Jun. 10, 2003, and incorporated herein by reference; application Ser. No. 10/457,439 is a Non Prov. of Provisional U.S. Patent Application Ser. No. 60/440,618, filed on Jan. 17, 2003, and incorporated herein by reference; application Ser. No. 10/457,439 is a Continuation-In-Part of U.S. patent application Ser. No. 10/319,725, filed on Dec. 16, 2002, and incorporated herein by reference; application Ser. No. 10/319,725 is a Non Prov. of Provisional U.S. Patent Application Ser. No. 60/343,237, filed on Dec. 31, 2001, and incorporated herein by reference; application Ser. No. 10/319,725 is a Continuation-In-Part of U.S. patent application Ser. No. 09/971,672, filed on Oct. 9, 2001, and incorporated herein by reference; application Ser. No. 09/971,672 is a Divisional of U.S. patent application Ser. No. 09/516,215, filed on Feb. 29, 2000, and incorporated herein by reference; application Ser. No. 09/516,215 is a Non Prov. of Provisional U.S. Patent Application Ser. No. 60/123,170, filed on Mar. 5, 1999, and incorporated herein by reference; application Ser. No. 11/342,289 is a Continuation-In-Part of U.S. patent application Ser. No. 11/257,416, filed on Oct. 24, 2005, and incorporated herein by reference; application Ser. No. 11/257,416 is a Continuation-In-Part of U.S. patent application Ser. No. 11/203,823, filed on Aug. 15, 2005, and incorporated herein by reference; application Ser. No. 11/203,823 is a Continuation-In-Part of application Ser. No. 10/756,799, filed on Jan. 14, 2004, and incorporated herein by reference; application Ser. No. 10/756,799 is a Continuation-In-Part of U.S. patent application Ser. No. 11/031,457, filed on Jan. 7, 2005, and incorporated herein by reference; application Ser. No. 11/031,457 is a Non Prov. of Provisional U.S. Patent Application Ser. No. 60/534,706, filed on Jan. 8, 2004, and incorporated herein by reference; application Ser. No. 11/031,457 is a Continuation-In-Part of U.S. patent application Ser. No. 10/751,115, filed on Jan. 5, 2004, and incorporated herein by reference; application Ser. No. 10/031,457 is a Continuation-In-Part of U.S. patent application Ser. No. 10/743,042, filed on Dec. 23, 2003, and incorporated herein by reference; application Ser. No. 10/743,042 is a Continuation-In-Part of U.S. patent application Ser. No. 10/638,524, filed on Aug. 12, 2003, and incorporated herein by reference; application Ser. No. 10/638,524 is a Divisional of U.S. patent application Ser. No. 09/516,215, filed on Feb. 29, 2000, and incorporated herein by reference; application Ser. No. 09/516,215 is a Non Prov. of Provisional U.S. Patent Application Ser. No. 60/123,170, filed on Mar. 5, 1999, and incorporated herein by reference; application Ser. No. 11/342,289 is a Continuation-In-Part of U.S. patent application Ser. No. 11/145,170, filed on Jun. 6, 2005, and incorporated herein by reference; application Ser. No. 11/145,170 is a Continuation-In-Part of U.S. patent application Ser. No. 11/111,957, filed on Apr. 22, 2005, and incorporated herein by reference; application Ser. No. 10/111,957 is a Continuation-In-Part of U.S. patent application Ser. No. 10/743,042, filed on Dec. 23, 2003, and incorporated herein by reference; application Ser. No. 10/743,042 is a Continuation-In-Part of U.S. patent application Ser. No. 10/638,524, filed on Aug. 12, 2003, and incorporated herein by reference; application Ser. No. 10/638,524 is a Divisional of U.S. patent application Ser. No. 09/516,215, filed on Feb. 29, 2000, and incorporated herein by reference. Application Ser. No. 09/516,215 is a Non Prov. of Provisional U.S. Patent Application Ser. No. 60/123,170, filed on Mar. 5, 1999, and incorporated herein by reference.

The subject matter of the present application is related to the following issued U.S. patents, assigned to the same assignee as the present invention, all of which are incorporated herein by reference in their entirety:

U.S. Pat. No. 5,999,116, issued Dec. 7, 1999, entitled "Method and Apparatus for Improving the Surveillance Coverage and Target Identification in a Radar Based Surveillance System";

U.S. Pat. No. 6,094,169, issued Jul. 25, 2000, entitled "Passive Multilateration Auto-Calibration and Position Error Correction";

U.S. Pat. No. 6,211,811, issued Apr. 2, 2001, entitled "Method and Apparatus for Improving the Surveillance Coverage and Target Identification in a Radar Based Surveillance System";

U.S. Pat. No. 6,384,783, issued on May 7, 2002, entitled "Method and Apparatus for Correlating Flight Identification Data With Secondary Surveillance Radar Data";

U.S. Pat. No. 6,448,929, issued Sep. 10, 2002, entitled "Method and Apparatus for Correlating Flight Identification Data With Secondary Surveillance Radar Data";

U.S. Pat. No. 6,567,043, issued May 20, 2003, entitled "METHOD AND APPARATUS FOR IMPROVING THE UTILITY OF AUTOMATIC DEPENDENT SURVEILLANCE";

U.S. Pat. No. 6,633,259 issued Oct. 14, 2003 "METHOD AND APPARATUS FOR IMPROVING THE UTILITY OF AUTOMATIC DEPENDENT SURVEILLANCE";

U.S. Pat. No. 6,806,829, issued Oct. 19, 2004, entitled "METHOD AND APPARATUS FOR IMPROVING THE UTILITY OF AUTOMATIC DEPENDENT SURVEILLANCE";

U.S. Pat. No. 6,812,890, issued Nov. 2, 2004, entitled "VOICE RECOGNITION LANDING FEE BILLING SYSTEM"; and U.S. Pat. No. 6,885,340, issued Apr. 26, 2005, entitled "CORRELATION OF FLIGHT TRACK DATA WITH OTHER DATA SOURCES".

FIELD OF THE INVENTION

The present invention relates to enhancements in the use of multilateration in noise and operations management.

BACKGROUND OF THE INVENTION

In an article published in Airport Noise Report (www.airportnoisereport.com) in 2004, inventors Tom Breen and Alex Smith discuss how airport noise office needs are driven by technology and innovation in the market. The article comments on upcoming years in the airport noise monitoring business and identifies a number of positive trends in the industry. The following paragraphs are an extract from that article.

"The aviation industry is rapidly progressing towards the next generation of noise and operations monitoring systems (NOMS) as early adopters of the technology are gearing up for replacement of their legacy systems. Today's NOMS users are more sophisticated and are demanding high-tech solutions to their problems. The industry has responded and we are starting to see more innovation in the marketplace with the release of new systems and services and an increase in noise and operations monitoring patents and intellectual property.

Once the domain of expensive UNIX workstations, the NOMS market is now entirely focused on the personal computer, integration with desktop office software, and corporate networks. It is no longer satisfactory for isolated noise offices to produce weekly noise level reports on paper, plot low resolution flight tracks on a crude base map three days later, and hand type noise complaints into a database from a telephone answering machine. The next generation NOMS user is demanding real-time high-fidelity aircraft tracking and identification systems, calibrated base maps and geographic information systems, and Internet-based complaint data entry systems that feed more data than ever before into the NOMS while requiring less time from office staff.

These next generation systems are able process and provide significantly more data at a lower cost than previous systems. The Internet has revolutionized the way Americans get information and this revolution has not been lost on the next generation NOMS users who expect the Internet to be an integral part of their next NOMS. Features such as automated complaint entry systems based on Internet technology and Web-based noise office information portals are two new product trends being described in technical specifications being written today.

Another important development is the trend towards increasing data fidelity and availability in real time. The synthesis of new noise monitoring technology, improved aircraft tracking techniques, and the incorporation of other important data sources such as Digital Automated Terminal Information System (D-ATIS), will provide noise offices with more accurate information more quickly than previously thought possible.

Rannoch (Rannoch Corporation, Alexandria, Va., the assignee of the present application) has recently developed a unique capability to converge D-ATIS and other operations data with NOMS data. The D-ATIS data contains information about current weather (METAR), runways in use, field conditions, and advisories (NOTAMs), allowing AirScene™ to achieve the next dimension of awareness in terms of the airport operating conditions and flight conditions each flight experienced. Answers to questions that arise about whether airfield conditions explain why an aircraft did not follow a particular procedure are now easily and automatically explained by a report produced using Rannoch's AirScene™ NOMS.

Another interesting enhancement to the AirScene™ product line that is likely to increase data fidelity is (Rannoch's) new fully-integrated digital voice recorder. The AirScene™ voice recorder is fully integrated into the AirScene™ system. The user simply clicks the flight track of interest, and the AirScene™ digital recorder immediately plays back the ATC recordings made during that event. This automatic correlation of the digital voice recordings with the flight tracks significantly reduces the time and effort required to conduct this type of investigation.

The NOMS market is demanding innovative technological solutions and Rannoch is responding. (Rannoch) has recently joined the prestigious FAA Center of Excellence Aircraft Noise and Aviation Emissions Mitigation, created to identify solutions for existing and anticipated aircraft noise and emissions-related problems. Rannoch has also been awarded a five-year contract from the DOT's Volpe Center in Cambridge, Mass. This contract will be used to fund projects including new systems for improving aircraft tracking, surveillance, communications, air traffic management, and new technologies for airport environmental monitoring systems. These important research contracts ensure that Rannoch's internal product development is in lock step with current and future industry needs.

The fusion of automated data streams into the next generation noise and operations monitoring systems allows a level of understanding and awareness not possible a few years ago. Noise office staff members, who used to wait days for restricted-use flight tracks from the FAA, can now access high fidelity tracking information in real-time using technologies, which just a few years ago, were restricted to the military and air traffic control industry. Given the current rate of advancement and innovation we are seeing the noise and operations monitoring business, the presence of new aggressive vendors, and resurgence of the American aviation industry, the rate at which the NOMS business is changing is likely to continue accelerating over the next few years."

The above excerpt from the *Airport Noise Report* article outlines some of the innovations set forth in the parent applications of the present patent application, in particular, U.S. Patent Provisional Application Ser. No. 60/440,618 filed on Jan. 17, 2003, and corresponding U.S. patent application Ser. No. 10/751,115, filed on Jan. 5, 2004, entitled "Method and Apparatus to Correlate Aircraft Flight Tracks and Events with Relevant Airport Operations Information" (Alexander E. Smith et al.), both of which are incorporated herein by reference. These parent patent applications describe how airport operations and noise monitoring may be automated using multilateration and data fusion techniques. The following paragraphs describe the background of the application of Multilateration into the Noise Industry.

Multilateration has become extremely popular for aircraft tracking in the past several years. The majority of all U.S. Noise and Operations Monitoring (NOMS) contracts in recent years use multilateration as the surveillance source. Multilateration offers tracking capabilities not available from any other techniques or systems, and is particularly useful for tracking aircraft at low flight levels and on surface areas. The following review of different multilateration systems is based on publicly available information, which is believed to be correct, but readers are advised to make their own assessment. Most of the technical information provided herein is supplied from the various vendor websites (e.g., sensis.com, era.cz, and roke.co.uk, all three of which are incorporated herein by reference) and various publicly available sources including a November 2004 report NLR-CR-2004-472, entitled *Wide Area Multilateration, Report on EATMP TRS* 131/04, Version 1.0, by W. H. L. Neven (NLR), T. J. Quilter (RMR), R. Weedon (RMR), and R. A. Hogendoorn (HITT), also incorporated herein by reference.

Because of the significant investment in science and engineering required to successfully commercialize and produce multilateration products, there are only three or four companies in the world that produce multilateration systems. Additionally, one or two other large air traffic control systems providers claim to be testing prototype systems or to have multilateration systems in development. For example, Siemens Roke Manor has deployed systems used for height monitoring and has stated on their website other potential applications including wide area tracking.

Companies that have actually fielded a wide area multilateration system include Sensis Corporation, ERA, and Rannoch Corporation. Sensis is a U.S. company whose clients are mainly FAA and other aviation authorities. ERA is a Czech Republic company and has several European aviation authority clients. Rannoch (assignee of the present application) is a U.S. company whose clients include FAA, NASA, and several airport authorities. Each company uses the same general concept of time difference of arrival (TDOA) measurement for multilateration. However, the methods and system architectures used by each company are very different. Each company uses remote receiver stations and a central processing system or central server. One of the key requirements for TDOA measurement is accurate time-stamping of received aircraft transponder signals. The accuracy of the time-stamping is essentially the synchronization of the system and it must be performed to within a few nanoseconds (a few billionths of a second) in order to achieve accurate tracking results.

There are three different methods in use currently to perform synchronization. Sensis Corporation uses a reference transponder technique. This approach places a fixed transmitter or set of transmitters around the airport. The transmitters emit a transponder signal, just like aircraft, but from a fixed location. The system then uses these special transponder signals as a time reference (hence the term reference transponder) and then all other received transponder signals are timed relative to the reference.

The technique works well but has two main disadvantages. The first is that the system generates it own transmissions on the 1090 MHz radar frequency and the transmitters need line-of-sight to the receiver stations. In the U.S., the FAA will not allow this approach to be used for anything other than air traffic control (ATC) or Federal Government programs, as it uses some of the available capacity of FAA's radar frequency spectrum. Antennas used by Sensis for this technique, are illustrated in FIG. 1. These antennas are rather large and bulky, and as line-of-sight antennas, may need to be properly oriented. Approximately 35 airports in the U.S. are slated to receive a Sensis ASDE-X multilateration system sometime over the next 10 years.

A second approach is the central timing technique as used by ERA. This approach relies on the central processor to perform all of the timing from a single accurate clock source. Receivers placed around the airport do not perform time-stamping, they merely receive the aircraft's transponder signal, up-convert the frequency of the signal, and transmit it to the central server. There is no time-stamping or digitizing of the signal at the receivers, they merely convert and re-transmit the received transponder signal. Since there is no digitizing or processing, there is a known fixed time delay in the conversion and re-transmission process. All of the time-stamping and digitizing can then be performed at the central server using one clock source.

This second technique has significant disadvantages. A high-bandwidth, high power microwave links are needed between each receiver and the central station, as shown in FIGS. 2A and 2B. FIG. 2A shows the separate high power antennas used by the airport central station, one for each receiver. FIG. 2B shows the high power transmitter used for each receiving station. As can be clearly seen in the illustrations, these antennas are even larger and bulkier than those of FIG. 1. In addition, as line-of-sight antennas, they require careful orientation. Such antennas are fairly expensive as well. While this second technique has been approved at some airports in Eastern and Western Europe, the FAA has not approved it for use in the United States, nor is it anticipated that the FAA will approve it in the future, due to concerns with using additional radio frequency (RF) signals within the boundaries of an airport, which may cause interference.

The manufacturer's recommended datalink frequency range is in the 10-30 GHz bands, the recommended minimum bandwidth is 28 MHz, and the datalink power ranges from 10 s to 100 s of Watts. The FAA is traditionally one of the strictest aviation authorities in terms of granting approval for radio frequency transmissions at airports. If a system is proposed for other than air traffic control applications and requires transmissions outside of approved commercial frequency bands (such as the digital WiFi 802.11 standards) it has not traditionally received approval in the United States.

A third technique is the satellite timing technique as used by Rannoch Corporation, assignee of the present application. This third technique uses satellite timing at each receiver to time-stamp received transponder signals. There are several satellite systems available including the U.S. Global Positioning System (GPS). The Rannoch AirScene™ system uses a patented (U.S. Pat. No. 6,049,304, incorporated herein by reference) technique for satellite synchronization, which is accurate to a few nanoseconds. In addition, the system offers advantages in equipment installation, as no line-of-sight is needed between receivers and the central station. Most importantly, there is no need to transmit any signals whatsoever, as data from receivers can be sent to a central station via non-radio techniques (e.g., hardwire, internet, local network, or the like). FIG. 3 illustrates one of Rannoch's receiver units combined with weather instrumentation into a compact installation package. From left to the right the items are: GPS, rainfall device, pressure device, wind speed and direction unit, and radar receiver unit. Note there are no transmitters in this package, and thus no additional RF signals are generated. Thus, FAA approval may not be required for such an installation. As illustrated in FIG. 3, the antenna installation of this third technique is much more compact, less expensive, and less obtrusive than the installations of the first two techniques as illustrated by FIGS. 1, 2A, and 2B.

A fourth technique is a height monitoring multilateration used by Siemens Roke Manor Research. Siemens was one of the pioneers of multilateration to determine aircraft height (i.e., altitude) for the reduced vertical separation program. Working with various governments and industry partners, Siemens deployed a handful of these sophisticated height measurement units. The company is believed to be embarking on an ambitious development program to apply this technology to commercial wide-area tracking.

The original height measuring devices used components and subsystems from many different suppliers, which made the overall systems very expensive. The systems were priced in the region of $10M USD each. As of October 2005, there are no known mature operational Siemens systems used for airport tracking applications such as NOMS. In mid 2005, in an independent assessment of the operational maturity of multilateration technologies, the German government (DFS) found only four companies to be qualified (Sensis, Rannoch, ERA, and Thales). Other systems, including the Siemens Roke Manor system, were not qualified by DFS as operationally mature at that time for airport tracking applications.

The different multilateration techniques are summarized in Table 1. Table 1 includes a column titled "active system." An active system is defined as one that needs to interrogate each aircraft to elicit a transponder reply. Of the four, only the Sensis system needs to interrogate aircraft, which is fundamental to the design of that system. The ERA and Rannoch systems do not need to generate interrogation signals as they both are designed to handle most aircraft transponder replies to a variety of other sources, such as ground radar or aircraft collision avoidance devices. Therefore, both the ERA and Rannoch systems can be classified as "passive" within the traditional definition of "active" and "passive."

However, this classification does not mean that all passive systems do not use radio frequency transmissions for some functions; it means only that the passive system does not interrogate aircraft transponders. As noted previously, the ERA "passive" system needs a high bandwidth microwave link (as illustrated in FIGS. 2A and 2B) and therefore must transmit high power signals constantly in airport environments, which is strictly prohibited at U.S. airports. The "passive" Rannoch system, on the other hand, does not transmit on any frequency for any purpose, and is used by the U.S. Federal Government for several monitoring projects and is authorized for non-air traffic control purposes, such as noise monitoring, at U.S. airports. Thus, as illustrated in Table 1, of the four multilateration systems available, only one, the Rannoch system, is truly passive, does not require generation of radio transmissions, and has been successfully implemented for airport noise and operations monitoring.

FIG. 4 illustrates an example of a real-time Rannoch AirScene™ display (in this example, from Louisville) and illustrates the ability of the system to provide data parameters from multiple AirScene™ sources in real time. In the example of FIG. 4, data blocks selected by the user for display include Mode A code (squawk), flight number (call sign), tail number, aircraft type, Mode C altitude, flight level, and origin and destination. AirScene™ can supply or use any of these data sources. The example shown is unique to AirScene™, as no other NFTMS can display all of the information as shown in real time. Other vendor approaches require extensive post-processing to match up the tail number with all of the other data.

FIG. 5 illustrates the same system when the operator queries a particular aircraft by highlighting it (UPS 6058 on the top right). All of the associated identification data is shown in the hyper-box on the right. When using AirScene™ multilateration tracking, runway utilization is very accurate, as the system will usually track the departure accelerating along the surface through rotation and departure. In the two examples of FIGS. 4 and 5, the user has selected all of the colors, icons, and GIS layers, including the 5 NM range rings shown.

As noted previously, the FAA is implementing an ASDE-X Multilateration Program in as many as 35 airports in the next 10 years in the United States. Many airport managers and operators have questions regarding the application of the ASDE-X program to commercial tracking applications. The following is an overview of the ASDE-X program and answers to frequently asked questions regarding that program.

The Airport Surface Detection Equipment-Model X (ASDE-X) program was initiated in 1999 and Sensis Corporation was selected as the vendor in the year 2000. The Senate Committee on Appropriations, in its report on FAA's fiscal year (FY) 2006 appropriations, expressed concern about the pace of ASDE-X deployment and reported that the FAA has not yet deployed systems to more than half of the planned sites due to changes in system design and additional requirements. The FAA originally planned to complete ASDE-X deployment to second-tier airports (e.g., Orlando International Airport and Milwaukee General Mitchell International Airport) by FY 2007 as a low-cost alternative to Airport Surface Detection Equipment-3 (ASDE-3) radar systems, which are deployed at larger, high-volume airports. However, the FAA now plans to complete deployment by FY 2009, resulting in a two year delay. While FAA has already procured 36 out of 38 ASDE-X systems, only three systems have been commissioned for operational use as of late 2005. FAA has invested about $250 million in ASDE-X and expects to spend a total of $505 million to complete the program. (See, e.g., www.faa.gov). A map of planned ASDE-X installations (from www.asdex.net, incorporated herein by reference) as well as upgrades to the older ASDE-3 systems is illustrated in FIG. 6.

One question airport operators have is that if the FAA plans to install ASDE-X at their airport, what additional benefits, if any, would be provided by an AirScene™ system? The answer is that airports should be aware of realistic dates to receive an ASDE-X system, based on the delays and cost overruns associated with program. Once installed, the ASDE-X will provide coverage only on the movement areas, not in the terminal area, on the ramps, aprons, or to the gates. Furthermore, the ASDE-X system is an FAA system and airport access to the data is not guaranteed on an unrestricted or even on a restricted basis.

Thus, a number of ASDE-X airports have contracted for and are currently using an AirScene™ tracking system. These airports include T. F. Green State Airport, Providence, R.I., San Antonio International Airport, TX, and Raleigh Durham International Airport, NC. Several more ASDE-X airports are currently in contract negotiations and discussions for an AirScene™ system.

Another question airport operators ask is if their airport is receiving an ASDE-X system for the runways and taxiways (movement areas) would it just be a small incremental cost to add coverage at the gates, ramps, and aprons? While it would seem logical that the costs would be incremental, based on experiences at several airports, the cost of adding to a planned ASDE-X installation can be significantly higher than the installation of a complete stand-alone AirScene™ airport management system. Furthermore, adding onto an ASDE-X installation ties the program schedule to the FAA's schedule and involves the FAA directly in the airport's program. As a stand-alone system, the Rannoch AirScene™ does not require regulation, intervention, monitoring or interaction with the FAA or Air Traffic Control systems. Thus, an airport manager or operator can implement and operate the Rannoch AirScene™ system without having to obtain permission from the FAA and without government interference.

Another question is whether the ASDE-X system affects the performance of the AirScene™ system and/or whether the AirScene™ system affects the ASDE-X system. As noted above, the Rannoch AirScene™ system is a truly passive system. Thus, there are no detrimental effects to either system when they are both operational at the same airport. On the contrary, the presence of an ASDE-X system generates more transponder replies for the AirScene™ system to detect and build aircraft tracks. Since AirScene™ is a passive system; it causes no interference to the ASDE-X system whatsoever.

Another concern of airport operators is that is seems that there is a lot of work involved in finding sensor sites for ASDE-X sensors, and arranging telecommunications, particularly when some of the sites are located off airfield. AirScene™, however, uses small compact sensors and antenna (See, e.g., FIG. 3), which can be located virtually anywhere (on-site or off-site), and the communications are flexible, ranging from telephone lines, to TCP/IP, or other industry standard forms of communication. Off-airport sites pose a significant challenge for ASDE-X due to problems with eminent domain, lease arrangements, and physical siting constraints due to the need for all ASDE-X sensors to have line-of-sight to the airport.

In contrast, AirScene™ sensors do not need line-of-sight to the airport and are so small that they can be mounted atop shared wireless communication towers. Through a contract with cell providers, AirScene™ has access to over 20,000 towers across the country. Therefore, there are few, if any issues of eminent domain, leasing, or siting with an AirScene™ system. Table 2 illustrates a comparison summary between ASDE-X and the AirScene™ system. As illustrated in Table 2, only the AirScene™ system presently provides a practical system for airport management.

From the foregoing description, it is quite clear that the only practical system for airport NOMS presently available is the Rannoch AirScene™ system. However, airports are becoming increasingly complex as a result of increased security concerns, increased traffic flow, cost reduction pressures, and the like. As a result, it is desirable to expand the capabilities and further enhance the AirScene™ system to provide additional features, which are of use to airport managers and operators in both the day to day operations of an airport, as well as in future planning and management. The present invention incorporates these improvements to the Rannoch AirScene™ NOMS.

SUMMARY OF THE INVENTION

The present invention provides a number of embodiments whereby multilateration techniques may be enhanced to provide additional or enhanced data and/or services for airport users, operators and other parties.

In one embodiment, multilateration data may be used for NOMS applications and may determine aircraft noise levels, either virtually, or combined with actual noise level measurements, and display such data in real-time or in response to queries from users. Such data may also be displayed on a website for designated users and/or members of the public or other individuals. Such a website may allow users to monitor noise levels and/or allow users or members of the public to enter noise complaints and the like. Virtual noise levels may be determined by knowing aircraft track (e.g., flight path, rate of climb, and the like) and type, as well as takeoff weight, fuel aboard, souls on board, and the like. From this data, noise levels can be accurately inferred based upon aircraft type and engine type. Noise levels from idling and taxiing can also be determined from ground track data obtained through multilateration.

Multilateration may also be used to enhance the placement of noise monitors in the community. Virtual noise calculations may be supplemented by actual noise monitoring stations (e.g., microphones) placed throughout a community. However, multilateration may allow for tracking of flight paths and provide a better model for placing such noise monitoring equipment. Thus noise monitors can be scientifically placed, rather than placed as based upon guesswork, political influence, or the like.

Once placed, multilateration can be used in real-time to trigger or "gate" signals from noise monitoring equipment, such that noise levels are measured only during periods were flights are nearby. Most noise monitoring equipment is indiscriminate with regard to type of noise recorded. Thus, if loud ambient noise from construction equipment, motorcycle or car, yard equipment (e.g., leaf blower or the like) occurs near the noise monitoring equipment, it may be reported as a false positive for a noise violation, even if no aircraft is nearby. By using aircraft tracking information in real-time, noise monitoring equipment may be monitored only when aircraft are in the immediate vicinity, thus eliminating false noise reports.

In another embodiment, aircraft emissions levels can be determined in a similar manner. Since emissions are a function of engine type and thrust, emissions can be virtually determined by measuring the load on the engine (based upon aircraft takeoff weight and climb profile) and knowing the type of engine on the aircraft. Aircraft identifying information can be used to access databases indicating aircraft type and engine type. In addition, the amount of time spent by an aircraft at the airport idling or taxiing can be determined by track data, such that emissions generated on the ground can be accurately calculated.

In a another embodiment, aircraft tracks are generated using multilateration systems independent of air traffic control radar, and are made available in real-time to noise monitoring personnel. Aircraft tracking data can then be correlated to measured noise level data to determine whether a noise violation has occurred or is in the processing occurring. If a noise violation is in the process of occurring, a pilot or other use can be warned of such an event, and can take effective action (e.g., reduce rate of climb, thrust, flight path, or the like) to alleviate noise levels. Noise violation information can be transmitted to a pilot or other user using audio radio signals, visual displays, recorded messages, or the like.

In another embodiment, multilateration is used to provide tracking and other data to operate airport websites, providing aircraft information for airport users and the general public. Such data can be used for noise monitoring websites, to elicit noise complaints from the public and assist the public and airport users in understanding noise problems. Members of the public and airport users may use such websites to determine whether a particular flight has arrived or departed, and where in the airspace or on the ground, a particular aircraft is located.

The entire system may be installed readily as a matrix of sensor packages installed on nearby shared wireless communication towers, along with a central station located in or near the airport. The sensor packages may include multilateration receivers for receiving radio signals from an airplane for use in determining aircraft position using multilateration techniques. The sensor packagers may also include physical noise and emissions monitors. The central station may receive signals from the sensor packages and generate detailed information regarding noise levels and emissions levels caused by aircraft. The use of this packaged approach reduces complexity and cost and eliminates the need for separate noise monitoring sensors and multilateration sensors.

Table 1 summarizes the different multilateration techniques in use today.

Table 2 illustrates a comparison summary between ASDE-X and the AirScene™ system.

DETAILED DESCRIPTION OF THE INVENTION

The present invention is now described with reference to the Figures where like reference numbers denote like elements or steps in the process.

Figure 1:
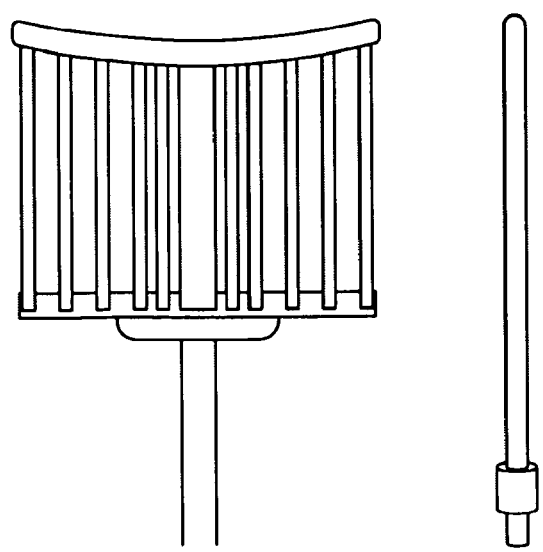
FIG. 1 illustrates examples of antennas used by Sensis for an aircraft tracking system 1.
Figure 2A:
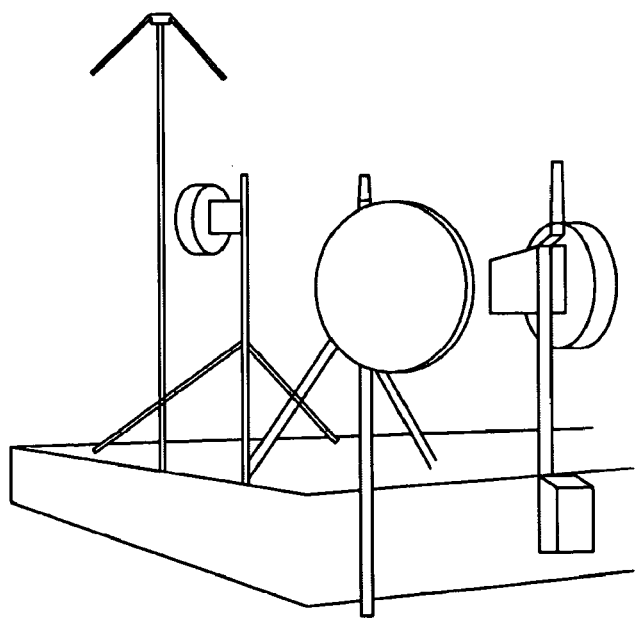
FIG. 2A illustrates a high-bandwidth, high power microwave link antenna used by the airport central station, one for each receiver in the ERA system.
Figure 2B:
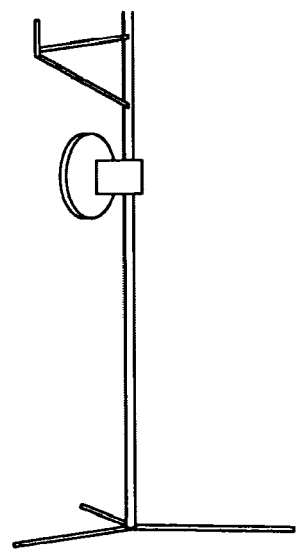
FIG. 2B illustrates the high power transmitter used for each receiving station, in the ERA system.
Figure 3:
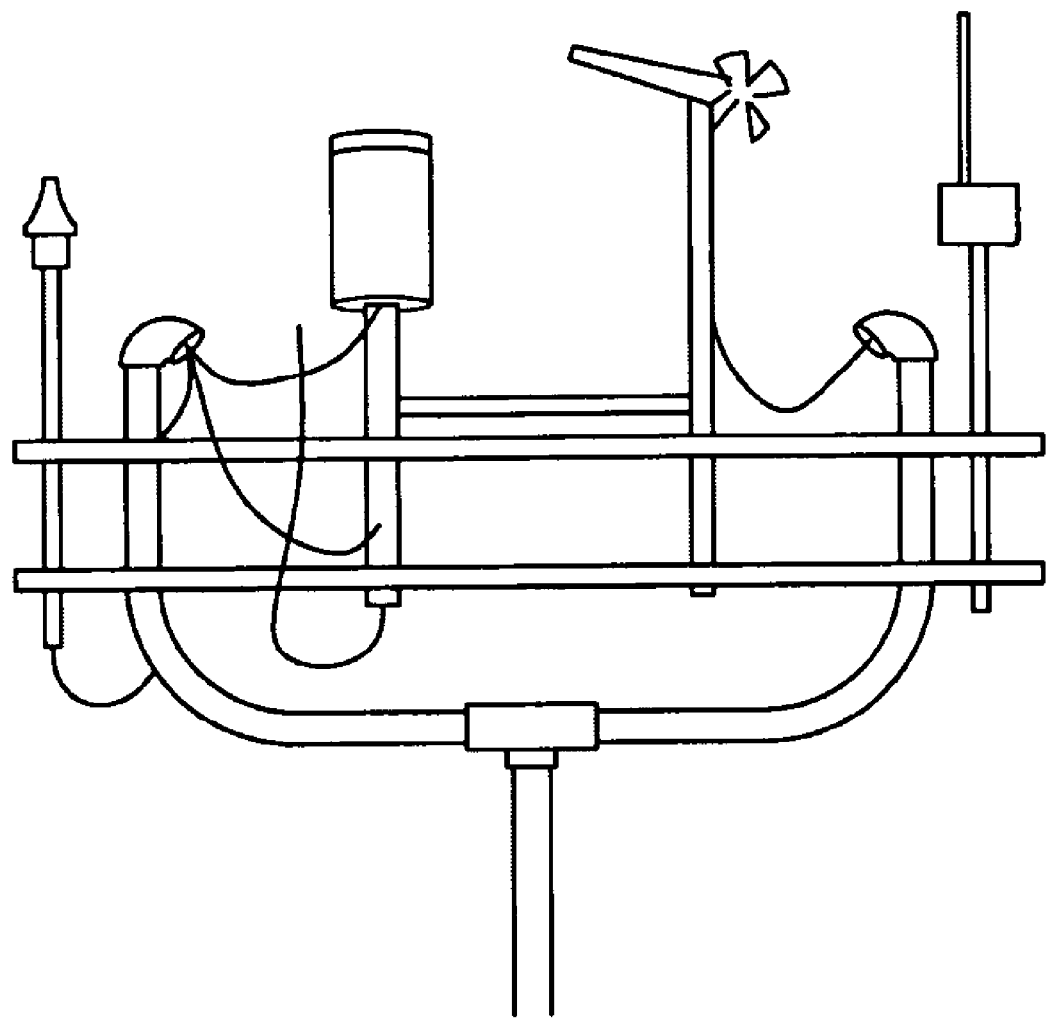
FIG. 3 illustrates one of Rannoch's receiver units combined with weather instrumentation into a compact installation package.
Figure 4:
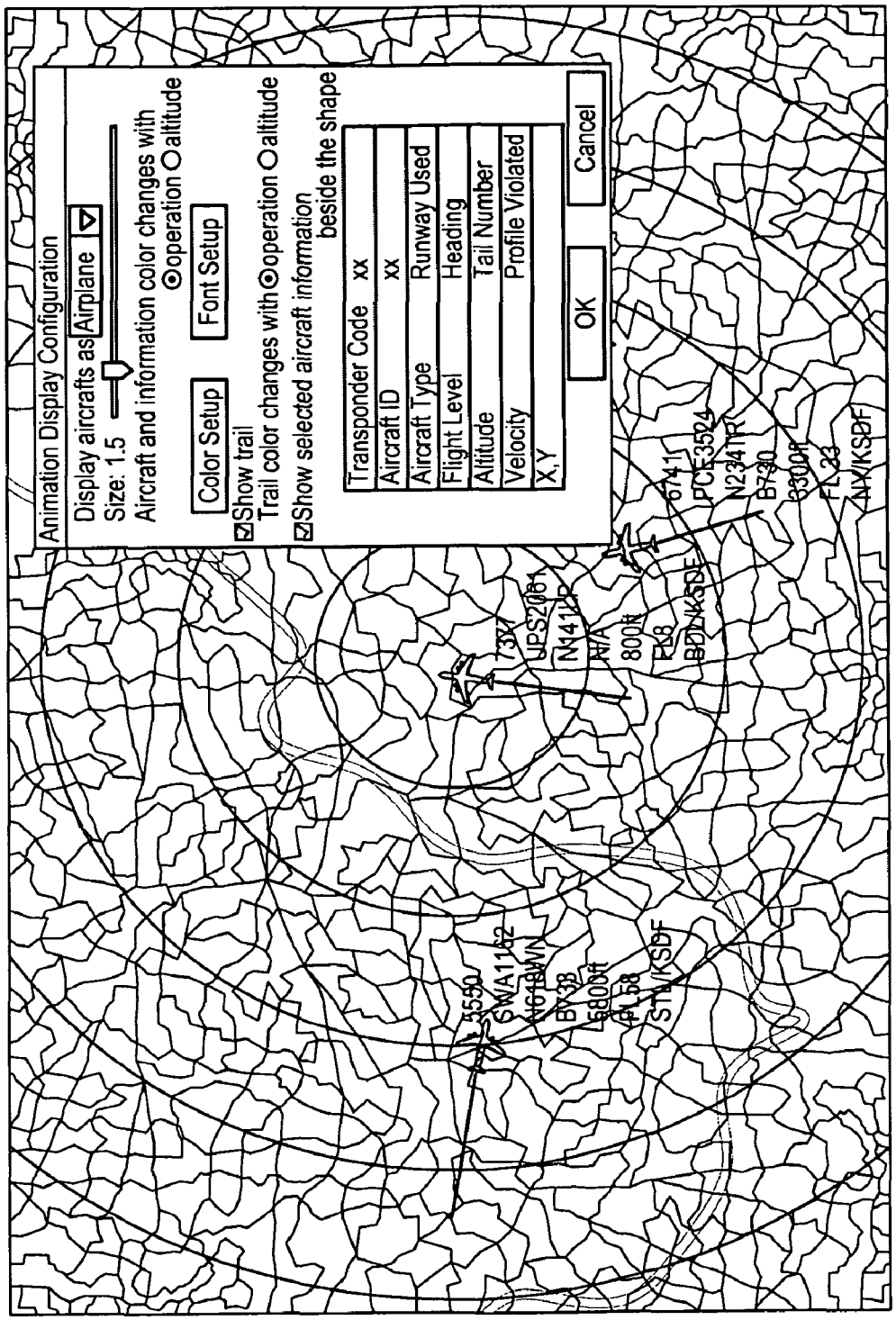
FIG. 4 illustrates an example of a real-time Rannoch AirScene™ display (in this example, from Louisville) and illustrates the ability of the system to provide data parameters from multiple AirScene™ sources in real time.
Figure 5:
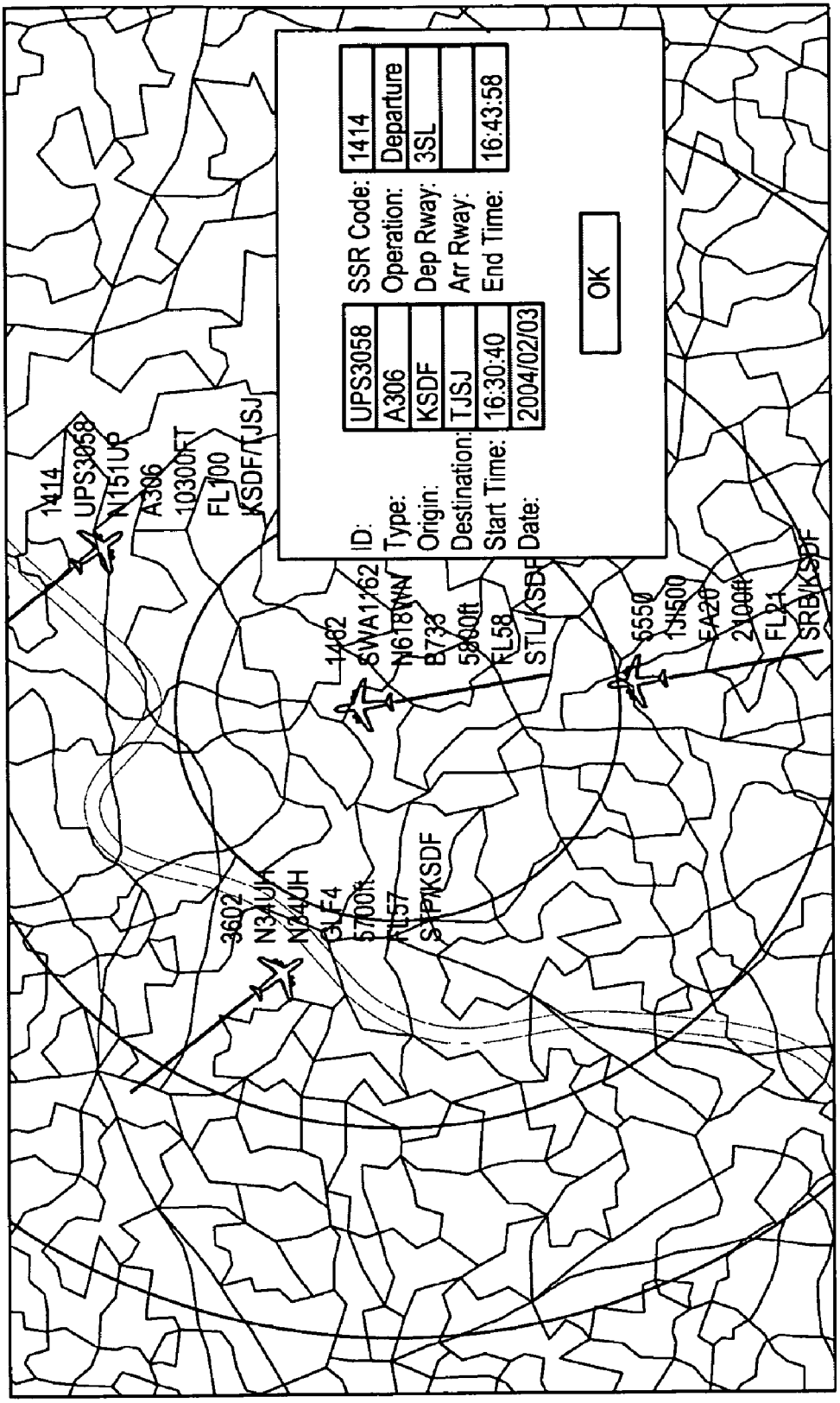
FIG. 5 illustrates the same system when the operator queries a particular aircraft by highlighting it.
Figure 6:
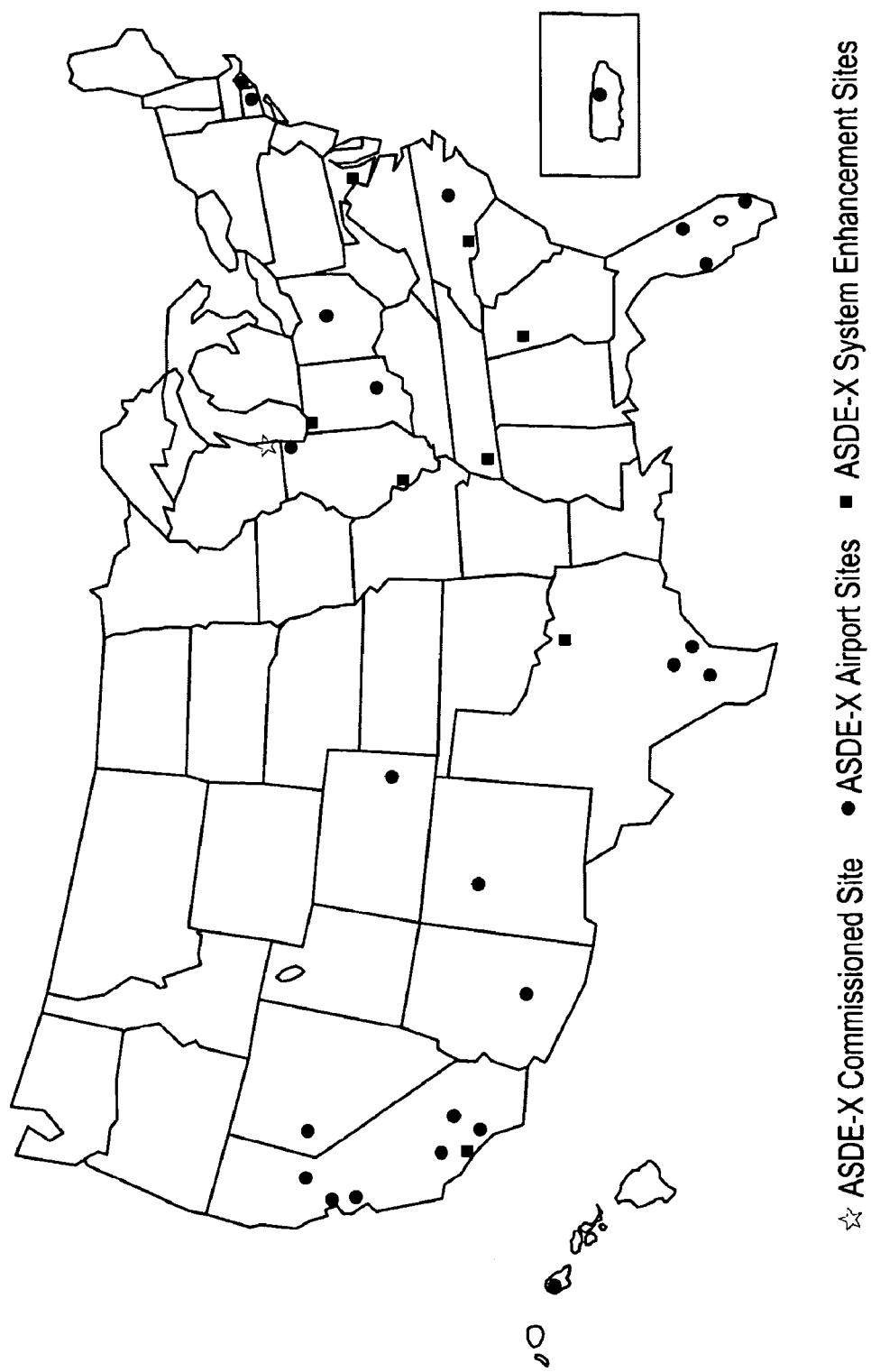
FIG. 6 illustrates a map of planned ASDE-X installations as well as upgrades to the older ASDE-3 systems.
Figure 7:
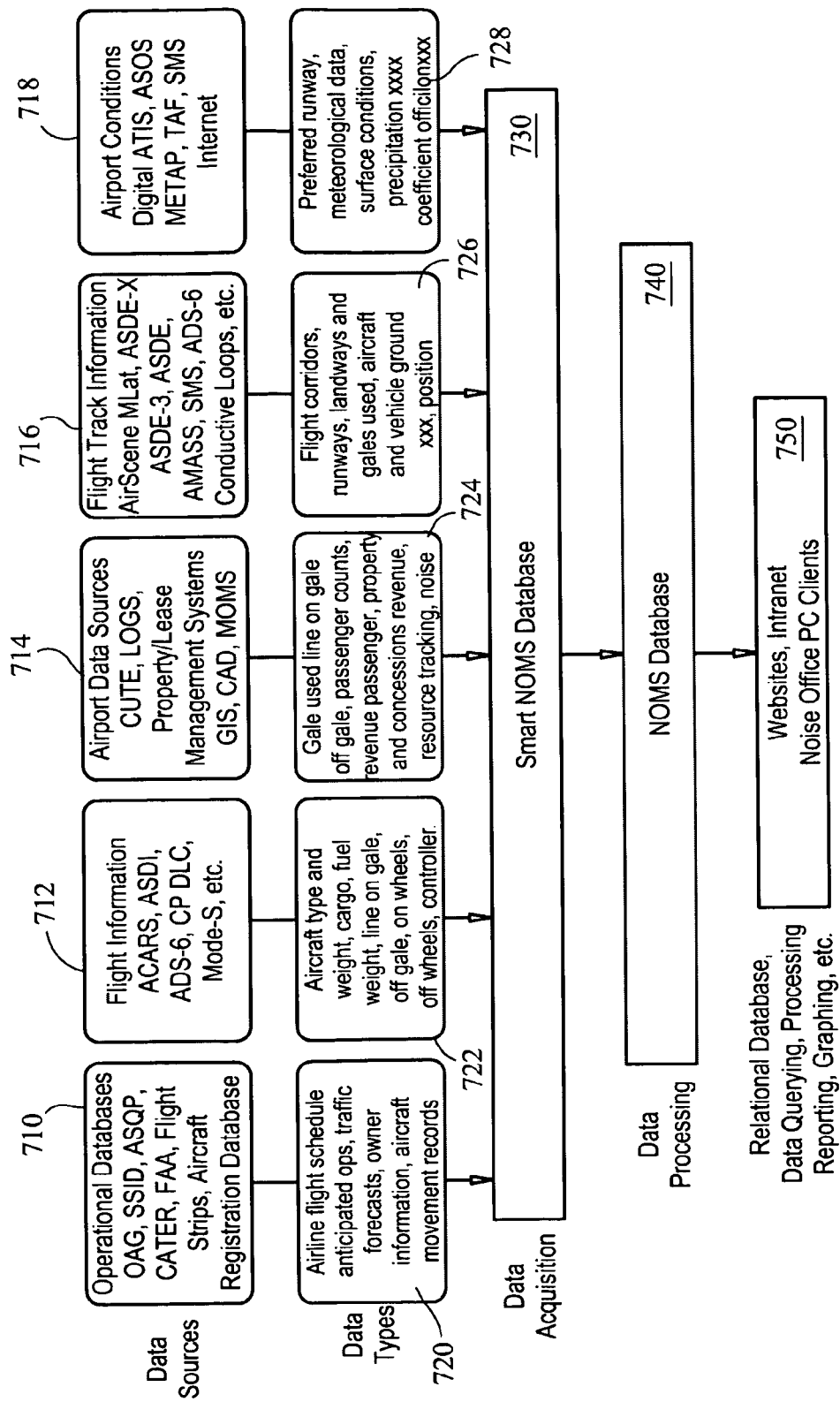
FIG. 7 illustrates a schematic for the AirScene™ system where the data sources are shown at the top.

FIG. 7 illustrates a schematic for the AirScene™ system where the data sources are shown at the top. These various sources may or may not be available in all systems, but would be used if they were available at a given airport.

Referring to FIG. 7, the system draws on data from the data sources 710, 712, 714, 716, and 718. These data sources may include Operational Databases 710. Operational Databases 710 may include the Official Airline Guides (OAG) databases, SSID (Supplemental Structural Inspection Document), the ASQP system, the FAA CATER (Collection and Analysis of Terminal Records) system, FAA Flight Strips, and Aircraft Registration Database. Resultant data 720 from Operational Databases 710 may include airline flight schedules, future anticipated operations, owner information, aircraft movement records, and the like.

Databases 712 may include Flight Information and may include Aircraft Communication Addressing and Reporting Systems (ACARS) data, Aircraft Situation Display to Industry (ASDI), Automatic Dependent Surveillance—Broadcast (ASD-B), Controller-Pilot Datalink Communication (CP-DLC), Mode-S transponder data, and the like. This data generated from aircraft by radio signals may include relevant data 722 such as aircraft type and weight, cargo, fuel weight, time on gate, off gate, on wheels, off wheels, air traffic controller (ATC) communication recording, and the like. From this data, it is possible to determine aircraft weight, type, number of passengers, and other data relevant to airport revenue management. For example, number of passengers on each airplane can be collected to determine total number of enplanements for the airport.

Databases 714 may include Airport Data Sources, including Common Use Terminal Equipment (CUTE), Local Departure Control System (LDCS), (See, http://www.damarel.com/products, incorporated herein by reference) Property/lease management systems, Geographic Information Systems (GIS), Computer Aided Design (CAD) data of airport terminals and facilities, Noise and Operations Monitoring System (NOMS), and the like. Databases 714 may produce data 724 such as gates used, time on gate, off gate, passenger counts, revenue passengers, property and concession revenues, resource tracking, noise levels, and aircraft service records. This airport information, for example, when correlated with other data, such as aircraft tracking data, can indicate which gate an aircraft is parked at, which runways were used, and the like.

Aircraft Multilateration Flight Tracking Systems 716 may comprise, for example, Rannoch Corporation's AirScene™ Mlat (multilateration) system, which is capable of identifying and tracking aircraft both in the air and on the ground using multilateration of radio signals. Other aircraft tracking systems may also be used, including aircraft sensors mounted in taxiways and runways (e.g. conductive loops or the like) or other types of systems. Examples of such systems includes various models of Airport Surface Detection Equipment (ASDE), such as ASDE-X (see www.asdex.net, incorporated herein by reference), ASDE-3, and ASDE, as well as Airport Movement Area Safety System (AMASS), SITA Information Networking Computing (SITA INC), Short Messaging Service (SMS) (See, http://www.sita.aero/default.htm, incorporated herein by reference), the aforementioned ADS-B, and the like. Data 726 from such systems can produce actual aircraft positions or tracks (paths followed). Position and speed of aircraft can also be determined from such data. In addition, data 736 may include flight corridors, runways, taxiways, and gates used by aircraft, as determined from vehicle ground track, position and speed, along with other aircraft information and communications.

Other data sources 718 may describe airport conditions and may include digital D-ATIS (Digital Automatic Terminal Information Service, see, http://www.arinc.com/products/voice_data_comm/d_atis/, incorporated herein by reference), Automated Surface Observation System (ASOS), METAR (Aviation Routine Weather Reports, available from the FAA and other sources), TAF (Terminal Aerodrome Forecast) the aforementioned SMS, Internet weather sources, and the like. These sources may produce data 728 indicating which runways are preferred, meteorological data, surface conditions, precipitation/icing, coefficients of friction, and the like.

Note that all of the data sources 710, 712, 714, 716, and 718 do not need to be used in order to produce a satisfactory NOMS system. Some or all of these sources may be used, and/or additional sources of relevant data may also be applied. Each source of data may generate data, which may be relevant to airport revenue or expenses. Missing data may be filled in by other sources. In addition, data from different sources may be used to correlate data to increase accuracy of data reporting.

All of the available data 720, 722, 724, 726, and 728 may be provided to a NOMS database 730, called a "smart database" which is then available to support the NOMS software 740, which is used to process the information. From the NOMS software 740 via the internet, intranet, or from PC Clients on the airport network a large variety of users 750 can run reports and perform other airport operations.

In a first embodiment of the present invention, multilateration is used to provide more extensive flight tracking and aircraft identification than other passive Radar tracking technologies. Passive tracking techniques have been available for over 20 years. Megadata's Passur (www.passur.com, incorporated herein by reference) is installed at many airports, while a newer version called SkyTrak is marketed by Lochard Corporation (www.lochard.com, incorporated herein by reference) and is installed at a few airports. Both of these systems rely on the presence of conventional radar for coverage, so they cannot provide coverage when there is no existing radar coverage.

Since these techniques rely on existing radar systems for tracking, both the type of radar, and its configuration, may limit performance. For example, for a recent NOMS deployment in Boca Raton, Fla., the airport selected Lochard Corporation using a SkyTrak passive aircraft-tracking device. There were many requirements identified in the Boca RFP for the flight tracking system including Section 2-1.1.1, on page II-3, requiring reports that use an aircraft's start of take off roll, which is only possible with a flight tracking system that has good low-level coverage at the airport.

The intention of the SkyTrak's passive technology was to provide the extreme accuracy required for close-in applications. Yet, based on Boca Airport Authority meetings, the SkyTrak did not perform and is no longer installed, nor operating at the airport. In the August 2005 minutes of a meeting of the Airport Authority, the authority voted on and approved the implementation of an FAA radar interface for the airport's noise and operations monitoring system. The minutes are located at http://www.bocaairport.com/pdf/min-authority/8-05MN.pdf, and are incorporated herein by reference.

Multilateration, on the other hand, has been demonstrated to drive NOMS at large and small airports with good low-level coverage throughout the United States and overseas. NOMS systems using multilateration include Cincinnati Lunken Municipal, Ohio, Providence, R.I., Indianapolis, Ind., Louisville, Ky., and San Antonio, Tex. In the present invention, multilateration is used to track aircraft Noise and Operations Monitoring (NOMS) as well as secondary applications, such as providing aircraft tracking data to airport website or the like. The multilateration system of the present invention does not rely upon radar, and thus can be installed without FAA certification, approval, or other regulation. Since the system is passive, no licensing from the FCC is required for radio transmissions. Existing signals from aircraft are received by a plurality of receivers, which may be located on-site or off-site. The use of off-site receivers is particularly useful in situations where airport authorities may resist the installation of a system, which may be perceived as competing with existing, more expensive hardware.

In a second embodiment of the present invention, multilateration is used to overcome traditional constraints regarding placement of monitors for noise measurement throughout the community. Placement of noise monitors around airports has not been an exact science. Oftentimes monitors are placed within political boundaries, or in certain people's back yards, without any real scientific reason. For example, for a Part 150 Study for Seattle/Tacoma airport, the noise consultants asked the airport's committee members to pick sites from maps. As recorded in the committees minutes in 1999, (See, e.g., http://sus.airportnetwork.com/Committees%20Meeting%2010-24-02.pdf., incorporated herein by reference) noise consultant Paul Dunholter asked committee members to suggest areas for placement of noise monitors:

"Paul Dunholter, Project Acoustical Engineer, explained the purpose of the noise monitoring process. The primary tool for the noise analysis is the integrated noise model which generates the noise contours. The monitoring provides information to engineers about noise levels generated by specific aircraft at specific locations that they can use to compare with the levels that model predicts. A network of noise monitors will provide a noise pattern that will be combined with radar data from Lambert Field and FAA aircraft situational display data. Placing monitors at key technical locations and at places the community chooses helps provide data to verify that the model will do a reasonably good job of predicting noise levels. There will be around eight to ten monitoring sites for continuous and five to six for spot measuring. The length of time will depend on weather conditions and mix of aircraft. Sideline noise is harder for the model to predict, so monitoring may help provide data to improve contour accuracy. Exact monitoring times will not be widely publicized. The noise monitoring is in addition to the FAA modeling requirements; the airport wants to obtain adequate data to verify that the model accurately predicts conditions around the airport. The model has been improved since the previous study. Besides the DNL contour, other metrics will be produced that will help the group evaluate how various alternatives will impact noise levels. This study will address aircraft associated with Spirit of St Louis Airport, not those from Lambert or other airport. Regarding corporate jets, the newer planes (Stage III) are dramatically quieter than the older models (Stage II) which are gradually becoming a smaller percentage (now around 10%) of the fleet mix. Mr. Dunholter asked committee members to look at the map and suggest sites for placing monitoring equipment within general areas. Several neighborhoods were identified and representatives asked to provide specific site proposal information."

Highly accurate flight track information from multilateration, coupled with detailed aircraft information, allows for accurate modeling of noise levels at any location. Coupling this with validation information based on several real time monitor locations allows for validated estimates throughout a local area. Therefore it is now possible to deploy a small subset of monitors at locations of convenience and to accurately model noise events from aircraft throughout an area around the airport.

In a third embodiment, multilateration is used to perform noise monitor event triggering based on real-time noise calculation and flight tracking. Triggering noise monitors acoustically is difficult in areas of high ambient or low source level noise. For example at the 129th ASA Meeting in Washington, D.C. in May 1995, Mr. Nathan B. Higbie gave a presentation on the subject as follows:

"The agreements negotiated for the new Denver Airport present an interesting example of how legal considerations can govern how noise measurements are made. The agreements stipulate certain noise limits on communities surrounding the airport. These limits are expressed in aircraft Leq(24), and are placed at 102 points, some over 15 miles away. There are financial penalties if any values are exceeded for a year. A signal-to-noise measurement problem resulted since modeled values of the aircraft Leq(24) were lower than measured Leq(24) community noise. The problems that needed solving were detection and quantification of aircraft noise in low signal-to-noise, and assignment of each noise event to its source. Arrays and other spatial techniques were proposed, but were too costly and would not meet Type 1 measurement requirements. A floating threshold was implemented so that noise events could be detected for any ambient condition. To date, all airport monitoring systems have used a fixed threshold since signal-to-noise is not a problem. The events are then correlated with the flight track data using a statistical pattern recognition algorithm whose parameters are optimized for each monitor location."

Specifically, Mr. Higbie pointed out that the problems that needed solving were detection and quantification of aircraft noise in low signal-to-noise, and assignment of each noise event to its source. One way to overcome this is to use a high fidelity multilateration flight tracking source which when integrated with the static monitors, will effectively tell the monitors when and where to detect aircraft noise events. This a priori knowledge would assist in event detection before the monitors are able to detect the aircraft based on real time noise measurement and modeling. This technique works where other monitor-based triggering techniques cannot, and it has much higher capture rates than conventional techniques. Works when signal levels are below noise levels.

In this embodiment of the present invention, aircraft tracking data may be used to trigger or "gate" local noise monitors, such that ambient noise is ignored when aircraft are not present in an area covered by a local noise monitoring device. When an aircraft track indicates it may be in the proximity of a noise-monitoring sensor, data from that sensor may be monitored during that period only. In this manner, ambient noise from local conditions will not be mistaken for airplane noise.

Similarly, triggering may be used to measure ambient noise at a location where no airplane noise is present. Determining the effect of airplane noise on a particular environment requires that a measurement of background or ambient noise be made, so that the effect of aircraft noise in the area of measurement be determined. If an area is inherently noisy due to ambient conditions (e.g., truck traffic or the like), then aircraft noise might not be deemed a nuisance. Abating aircraft noise in such ambient noisy environments is a waste of noise operations resources and also unfair to aircraft owners and operators. Using multilateration to track aircraft, it is possible to determine when a particular noise monitor is not being affected by aircraft. At such instances, measurements of ambient or background noise can be correctly made so that the overall effect of aircraft noise can be correctly evaluated.

In a fourth embodiment, multilateration may be used to support highly accurate correlation of aircraft flight tracks and aircraft identification to noise levels. Some older style noise monitoring systems had very limited flight tracking data, and some had none at all, meaning they could only really collect ambient noise levels over time with little or no correlation to aircraft flight tracks and movements. In a press release dated Jan. 15, 2003, BridgeNet provided the following information on a (then) new noise system at Jackson Hole Airport, Jackson Hole, Wyo. (www.airportnetwork.com, incorporated herein by reference):

"The Jackson Hole Airport Board, responsible for the Jackson Hole Airport (JAC), Teton County, Wyo., awarded the contract for the acquisition and installation of a permanent noise monitoring system (NMS) to BridgeNet International, based in Costa Mesa, Calif. This project presents several unique challenges for an airport NMS. The airport is located entirely within Grand Teton National Park, the only U.S. airport to have such a distinction. The pristine and sensitive environment require that the system measure noise in remote and quiet back country locations while blending in with the surrounding environment. BridgeNet International is utilizing noise-monitoring hardware manufactured by 01dB-Stell, (headquartered in Lyon, France) to provide a system capable of meeting the goals and requirements of the NMS desired by the Jackson Hole Airport Board. The noise monitoring system is designed to operate remotely with only the noise monitoring hardware located in the airport environs. All analytical and reporting tools are accessed through the Internet using BridgeNet's web-based technology. BridgeNet will provide the collection and analytical software tools allowing the airport to monitor, analyze and report the noise environment created by aircraft operations. All collected data and software will be located in BridgeNet's offices in California and can be accessed by JAC Airport through the Internet. This remote accessibility provides JAC Airport administrators with all of the analytical and reporting tools necessary to monitor and model the noise environment, without the need for additional personnel and cost. BridgeNet continues to pioneer the advantages of a "virtual noise office" by designing systems capable of integrating disparate data and then transforming this data into useful information via web-accessible applications software. The installation of a permanent NMS comes after many years of seasonal noise measurements and fulfills both the desires and requirements of the JAC Board to meet their obligations to the National Park Service and the Department of the Interior. Final installation will occur in summer of 2003."

Without an independent source of flight tracking that is independent of ground based Radar, airport noise offices such as Jackson Hole will have difficulty correlating flight information to noise events, as ground-based radar tracks are generally not available to noise officers in real-time. In order to properly identify noise events with particular aircraft, a noise officer needs unfettered access to tracking and noise data to make correlations, or to have such correlations made automatically. Air Traffic Control radar data is generally available only through the use of tapes or removable disks, which have to be requested and analyzed, often days or weeks after an event. By contrast, other similar small airports with no nearby Radar contracted for multilateration-based noise and operations systems and do have the capability to track and identify aircraft and performance many difference noise office functions that rely on flight tracks. These airports include Hyannis, Mass., Cincinnati Lunken, Ohio, East Hampton, N.Y., Ohio State University, OH, and Hanscom, Mass.

Aircraft noise violations can thus be determined in real-time, either by using measured noise data from noise monitoring systems, virtual noise calculations, or a combination of both and other techniques. Aircraft causing the noise violation can be identified in real-time. With this system, a pilot or other use can be notified in real-time of a noise violation, and effective action taken to alleviate or reduce the impact of the noise violation by reducing rate of climb, thrust, changing flight path, or other action. A pilot or other user may be notified using verbal radio commands, recorded messages, visual display, or the like.

Virtual noise calculation techniques can be used to warn when noise levels are approaching violation thresholds, such that the pilot or other use can be warned of such an occurrence. Different colors may be used in a visual display (e.g., green, yellow, red) to indicate noise level violation status, with green meaning no violation, yellow meaning a violation threshold has been approached, and red meaning a violation has occurred. Of course, the pilot retains ultimate authority over his aircraft, and can ignore such warnings if conditions require (e.g., emergency situation, weather conditions, or the like). In addition, virtual noise monitoring equipment can be aircraft-mounted, using rate of climb, thrust, load, and altitude data to calculate virtual noise levels on the ground.

Such a predictive system sending noise warnings to the pilot may do so in such a way not to interfere with safety. A pilot shouldn't be making a last minute evasive maneuver to avoid creating noise. However, the system may be programmed to advise the pilot that a if they are executing a particular standard arrival (STAR) or standard departure (SID) with a particular aircraft configuration and weight, and the like, that such conditions may or will cause a noise violation. Obviously, safety is paramount, and it would be necessary not to add to cockpit clutter and/or distract the pilot with noise data during sensitive takeoff and landing operations, unless such data could be presented in an unobtrusive manner and/or provided during pre-flight or non-sensitive flight times.

In a fifth embodiment, high fidelity aircraft dynamics from multilateration data is used to support new generation airport websites and provide unique website features. At the time of filing the present application, the WebScene™ website, powered by AirScene™ multilateration flight tracking, is poised to become the leading website for airport NOMS, with clients including Providence R.I., San Antonio Tex., Louisville Ky., Ohio State University, Ohio, Indianapolis, Ind., Boston, Mass., and Raleigh-Durham, N.C.

Figure 8:
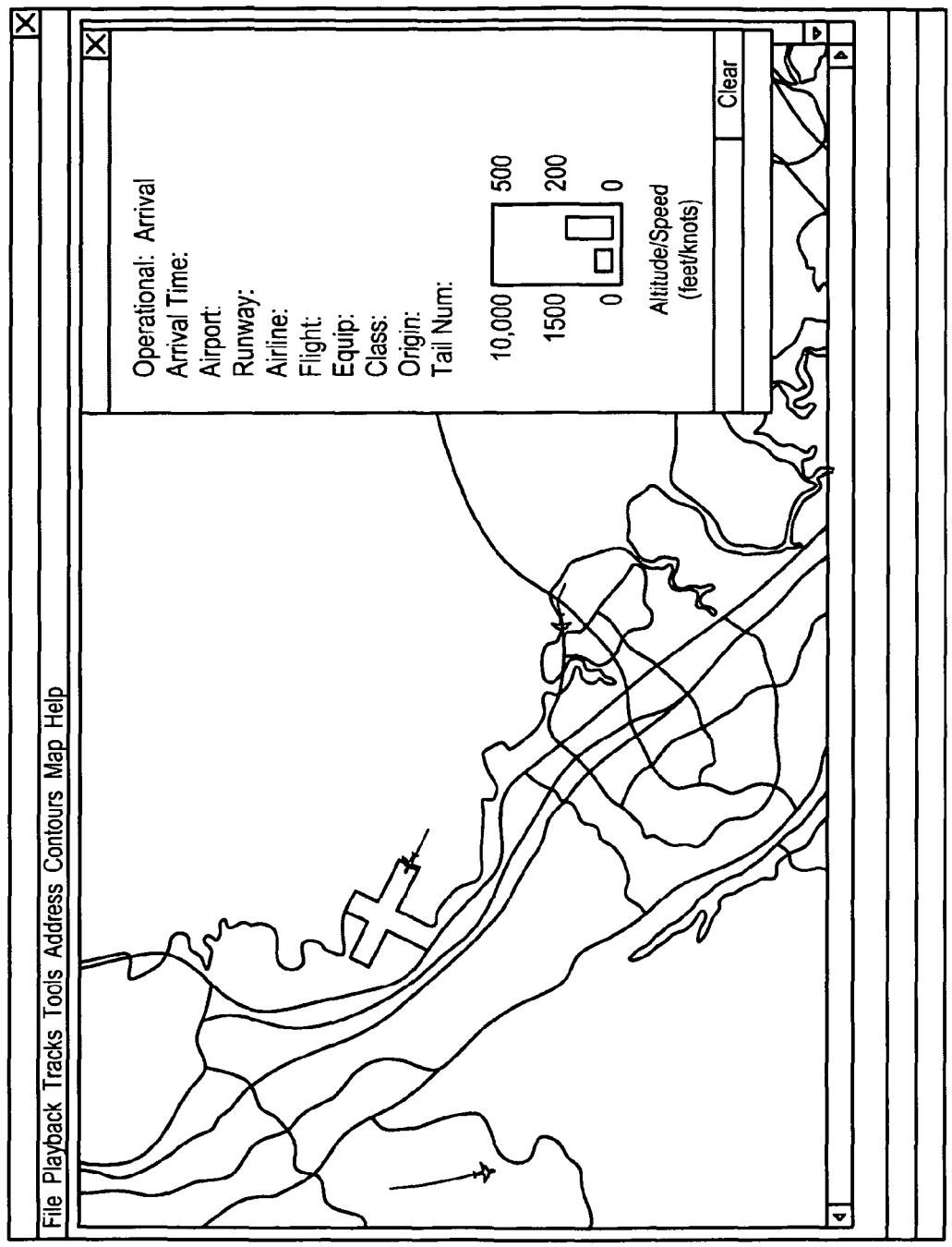
FIG. 8 illustrates examples of traditional-style website using near-real-time tracking of aircraft using their Mode A/C codes.

Examples of traditional-style websites include San Francisco International Airport shown at http://www.flyquietsfo- .com/live/, incorporated herein by reference. That website uses near-real-time tracking of aircraft using their Mode A/C codes (not Mode S) and therefore was unable to identify specific aircraft in near-real-time, as is illustrated in the example display of FIG. 8, where all of the aircraft identification fields are blank.

Figure 9:
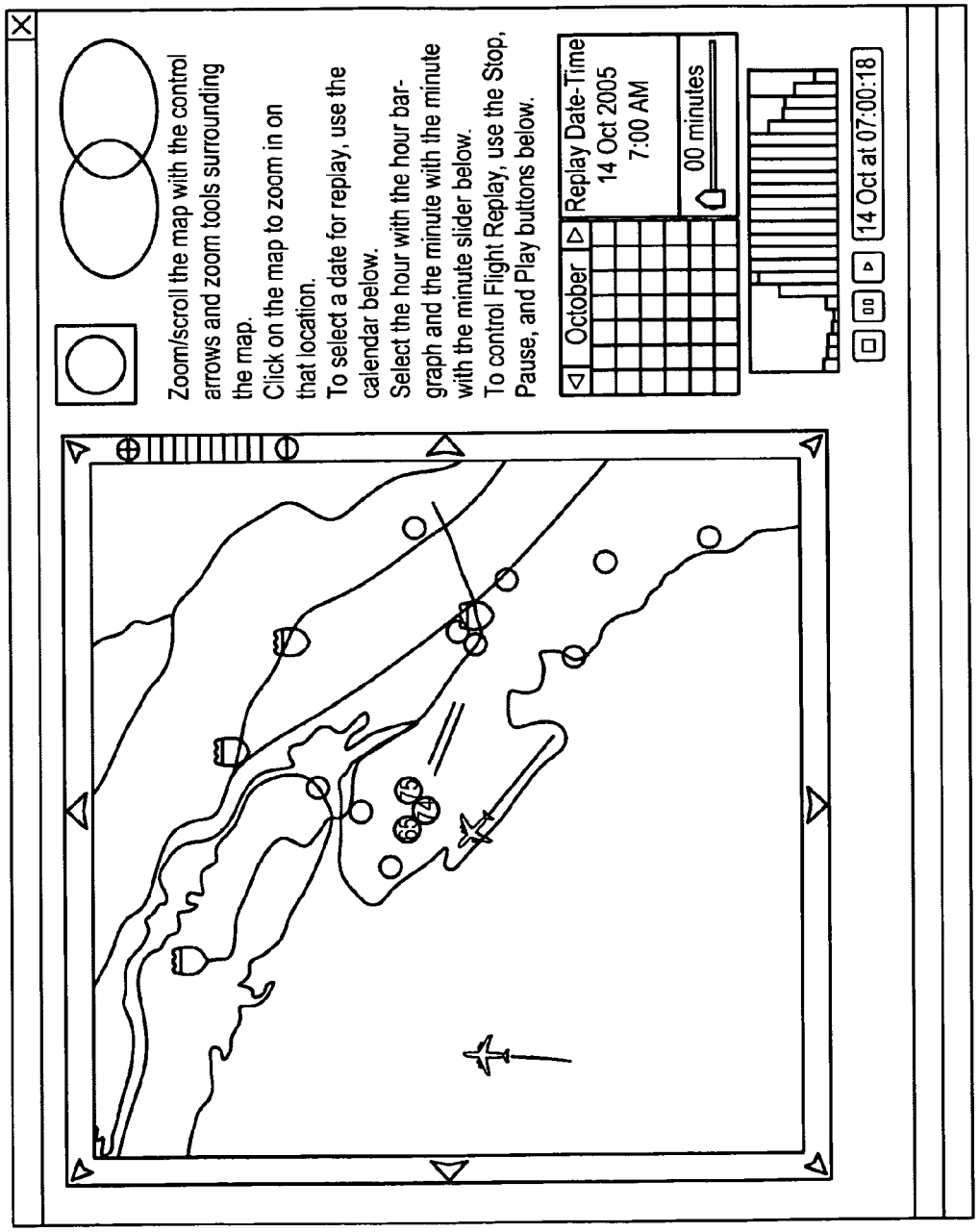
FIG. 9 illustrates an example of an airport websites using a timed delay of Government radar.

Other airport websites have used a timed delay of Government radar such as: http://www.oaklandtracks.com/noise/noise_management_replay.html, also incorporated herein by reference. This particular style of website requires the viewer to install an SVG plug-in before viewing. The flight tracks use delayed data from FAA Radars, and the noise levels are actual recorded levels as fixed noise monitor locations. Although plugs-in are required and the data are delayed in cooperation with the FAA, this style of website was quite progressive when it was introduced circa 2003. FIG. 9 shows an example of a web page display from that website.

In early 2005, Rannoch Corporation introduced a "$2^{nd}$ generation" website for airport noise and operations monitoring. This advancement offers a state-of-the-art noise monitoring system with a fully-integrated web solution. For some airports, the Web interface to AirScene™ is the primary method through which many airport employees and for most community users to experience the NOMS. In designing the interface it was vital that it be straightforward, intuitive, and secure. Rannoch also offers on-site fully-integrated approaches to websites in order to provide the highest levels of access, simplicity, functionality, flexibility, data security, and data consistency.

One of the primary functions of the website is to interactively display flight tracks on a base map. To accomplish this objective, Rannoch's web display design has an interactive map that has the capability display near-real-time and historical operations, tracks, and available noise data. A user may select a flight operation in order to; display flight number, aircraft ID, beacon code, "current" altitude and speed; initiate a complaint from the operation; perform an "is it normal" assessment of the operation based on criteria defined by the airport; zoom in and out, pan, re-center, and control playback speed; and zoom the map to a specific street address as part of an address lookup function.

The user community may also be able to submit complaints to the airport through the web interface. To accomplish this task, Rannoch's second-generation web solution provides an interactive complaint entry form for the users to enter critical information about the complaint. This form contains the following basic features: a complaint entry form and web entry form; complaint entry functionality that assures that complaint data are entered into the AirScene™ complaint database to maintain data continuity; and the capability to allow the user to enter complains either anonymously or as a registered user. For registered users, the system may provide: a secure login capability, and the ability to check the status of their complaints and receive status via email. The email response will be similar in form and content to the "Aircraft Disturbance Report".

Rannoch's web solution also allows the user to view reports. Some of the reports include runway utilization, property look-up, and noise contours. In addition, the user is able to run a subset of reports interactively on the website, facilitating user-driven analysis and information gathering on disturbances. Rannoch's $2^{nd}$ generation web solution is more seamless and secure than earlier predecessors. It reduces the need for browser plug-ins that the end user would need to install on their computer. Instead of re-directing the browser to outside URLs, the website can be hosted by the airport. Browsers can gain access to the data through Port 80 making use and support of the website simpler. This solution allows the airport to better control access, security to the data, and improve overall performance.

In a sixth embodiment, the use of multilateration flight tracking enables real-time modeling of aircraft noise levels throughout an airport's terminal area. This embodiment enables new features, which allow high-fidelity calculations of aircraft-generated noise substantially at any point in space around an airport. Virtual Noise Monitor (VNM) is a component of the next generation airscene.net platform.

Virtual Noise Monitoring makes use of the integration and fusion of data from multiple sources such as ACARS, D-ATIS and Rannoch's own high precision AirScene™ multilateration and ADS-B surveillance technologies, which provide the most complete, accurate, and real-time information on aircraft location and movement. Without denying the value of traditional noise measuring equipment, the inclusion of this extra information into high-power, user-friendly applications, which incorporate both existing and innovative modeling solutions, will allow airports to provide noise-monitor-equivalent output at any point in the community—on demand. Aircraft noise and emissions calculations had previously been greatly dependent on a variety of modeling assumptions and on a level of professional judgment that placed a practical limit on the accuracy and repeatability of the analysis. With billions of dollars of property development, noise insulation programs, and land acquisition activities riding on the calculation of the noise levels worldwide, the Virtual Noise Modeling of the present invention raises the industry standard for noise model accuracy.

The VNM process uses a number of techniques for improving the calculation of noise metrics based on data available only in AirScene™, including high-resolution flight track data from the ADS-B and multilateration flight tracking systems; actual aircraft weight, type, engine type and thrust; and a variety of weather and environmental information. More accurate modeling may help answer questions associated with questionable results from physical noise monitors located in areas where high ambient levels, other intrusive sources, and multiple simultaneous noise events prevent accurate measurements. AirScene™ features improve the accuracy of current modeling techniques by greatly improving the quality of the input data, especially flight track data. Since airports worldwide are becoming more dependent on noise modeling to direct large investments in residential insulation and property acquisition, the next logical step is to increase the accuracy of the modeling input.

Figure 10:
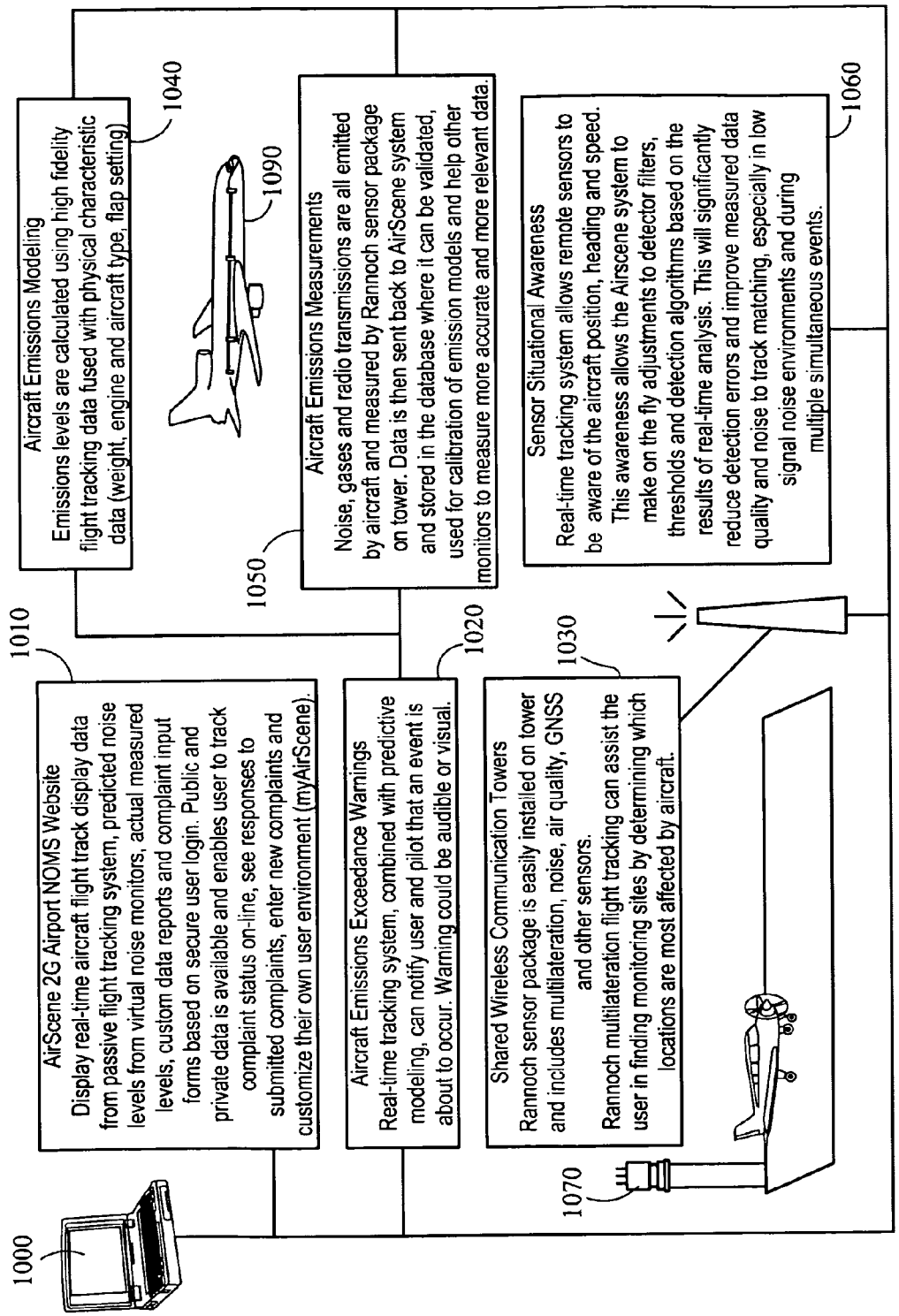
FIG. 10 is a block diagram illustrating the relationship between different embodiments of the present invention.

FIG. 10 is a block diagram illustrating the relationship between different embodiments of the present invention. As illustrated in FIG. 10, data from the various embodiments may be displayed on computer 1000 which may comprise a personal computer, workstation, or the like, connected directly to an AirScene™ system, or coupled though the internet or other network, which may display relevant data as a website or the like.

Such a website may comprise, for example, the AirScene™ Airport Noise Operations Monitoring (NOMS) website 1010 as illustrated in FIG. 10. NOMS website 1010 may display real-time aircraft flight track display data from a passive flight tracking system, such as the Rannoch™ AirScene™ multilateration system. From this accurate flight track data and from noise generation models, predicted noise levels from "virtual" noise monitor locations may be generated. These may be displayed along with noise levels from actual physical noise monitors, and the values compared to validate the noise models, and also indicate the validity of physical noise monitors.

As noted above and in earlier applications, flight track data from aircraft 1090 may be obtained by multilateration of radio signals from aircraft 1090. These radio signals may be received at a number of radio receivers 1030, which may be located at the airport 1070 or nearby. In one embodiment, receivers 1030 are located on shared wireless communication towers (e.g., cell phone antenna sites) or other readily accessible locations, and may be packaged with other monitors such as noise, emissions, and other environmental monitors (e.g., temperature, humidity, wind velocity and direction, wind shear, and the like). The accurate aircraft track produced through multilateration enhances the accuracy of existing and proposed virtual noise models. Moreover, the use of off-site radio receivers 1030 allows the system to operate independently from airport 1070.

Custom data reports may also be provided on website 1010 and complain input forms (either as on-line data entry or downloadable forms) may be provided via secure user login. Providing a user login with name and address and password data would prevent overly zealous noise complaint users from spoofing the system by providing false complaint data (e.g., entering a neighbor's name and address on a complaint form to make it appear that more people are complaining than actually are). Complaint data can be manually or automatically audited by e-mailing, calling, or mailing selected users to confirm whether their complaint was actually made.

Public and private data may be made selectively available to enable users to track complaint status on-line, see responses to submitted complaints, enter new complaints, and customize their own user environment (myAirScene™). Privacy concerns may be addressed by providing data selectively to users such that personal identification information (name, address, and the like) is available on a selected basis to system operators. Public users can monitor their own complaint data and may be allowed to view complaint data from others with personal information suitably redacted.

In another embodiment of the present invention, aircraft emissions exceedance warnings 1020 may be generated by the system. Real time tracking data, combined with a predictive modeling 1040, may notify a user and pilot when emissions from the aircraft may exceed predetermined guidelines. Again, from aircraft track, weight, engine type, and other data, aircraft emissions modeling may predict emissions using a virtual model based upon these inputs. This emissions warning may be audio or visual, and can be transmitted to the pilot in real-time. Such warnings can reduce the amount of airport emissions and thus help cities and other jurisdictions comply with clean air law requirements.

In addition, aircraft emissions modeling 1040 may be used to determine overall aircraft emissions from an airport, and calculate aircraft emissions over time. From such data, and airport operator can determine whether aircraft emissions are increasing or decreasing over time, and also determine what events are causing increased emissions. For example, if larger numbers of older, more polluting aircraft are the cause of increased emissions, an airport operator can work with airlines to schedule newer aircraft for routes to that airport. Alternately, landing fees can be evaluated and adjusted based upon emissions levels of aircraft involved, to provide an incentive for airlines to use lower emissions aircraft and/or train pilots to avoid high emissions producing maneuvers. Similarly, if it is determined that certain maneuvers are resulting in increased emissions, airport operators can study operations and determine whether standard approaches, runway use, or the like, can be modified to reduce emissions levels. In addition, idling and taxiing time may be monitored to determine whether such activities are contributing to airport emissions. There are number of different uses for such data, and only a few are enumerated here by way of example only. Overall emissions data may be used to comply with Federal clean air law requirements.

Note that these additional embodiments do not require a substantial additional investment in additional equipment. Aircraft emissions can be virtually calculated, which may be validated by actual emissions measurements by physical monitors packaged with receiver 1030 or at other locations. Thus, plurality of functional features may be provided using the same underlying hardware. Note also that in an additional embodiment of the present invention, multilateration tracking software may be used to locate the optimal placement for noise monitoring stations, based upon typical aircraft tracks or the like. Additional noise monitoring stations may be located at other shared wireless communication towers or other locations as required to accurately track the bulk of aircraft, based upon cumulative tracking data produced by the multilateration system of the present invention.

Actual aircraft emissions measurements 1050 may also be made to validate virtual emissions modeling 1040 and to provide the same warnings and airport operations options offered by virtual emissions modeling 1040. A combined sensor package, or individual emission sensors, may transmit emissions data to the AirScene™ database, where it may be fused with aircraft tracking data to generate actual emissions reports, and/or validate or supplement virtual emissions modeling.

In addition to the other features described above, the use of multilateration tracking allows for what is known as sensor situational awareness 760. As noted previously, Prior Art noise level monitoring was rather primitive, with little more than microphones being placed in the community. Prior Art emissions monitoring was not much more sophisticated. The problem with such plug-and-monitor approaches is that ambient noise, noise from other than aircraft sources, and sensor error could cause false data readings. The same is true for emissions modeling. If a loud, smoke-belching construction truck is operating next to a noise and/or emissions monitor, the monitors may report noise and emissions levels, which are unrelated to aircraft operations.

Since the present invention "knows" when there is an aircraft overhead or in the vicinity (via multilateration tracking) the system can cutoff emissions and/or noise measurements during periods when no aircraft are present in the vicinity. Thus, false positives in reporting data are eliminated. In addition, since the system also "knows" that there are no aircraft overhead or in the vicinity, noise and/or emissions monitors can take background or ambient measurements. Such data may prove (or disprove) whether aircraft are indeed a substantial cause of urban pollution (noise or emissions). If the effect of aircraft is demonstrated to be negligible, then resources for reducing noise and emissions can be redirected to other, more prominent sources. If aircraft, or certain aircraft or flight patterns are shown to be a cause of significant emissions or noise, then actions can be taken to reduce such problems. Whether aircraft are a significant source of noise and emissions, and how different aircraft and flight path affect these parameters is nearly impossible to determine without accurate measurement and modeling data. The present invention provides this solid data, which will allow airport operators to make more informed and effective decisions.

While the preferred embodiment and various alternative embodiments of the invention have been disclosed and described in detail herein, it may be apparent to those skilled in the art that various changes in form and detail may be made therein without departing from the spirit and scope thereof.

TABLE 1

| Company | aircraft using 1030 MHz | Synchronization Technique | Transmission for Synchronization? | Used for commercial Airport Monitoring in the United States? |
|---|---|---|---|---|
| Sensis | Active, interrogates aircraft using 1030 MHz | Reference Transponder | Active, interrogates aircraft using 1030 MHz | No. Generally limited to Government applications. No noise monitoring experience. |
| ERA | Passive system | Central Timing | Yes. Up-converted transponder signals are broadcast from each receiver to the central server | No. Limited to overseas Government applications. No noise monitoring experience. |
| Siemens/ Roke Manor | Passive system | Satellite Timing | No. Uses satellite timing and there are no transmissions for synchronization | No. There are no installations in the US. And the system is believed to be in development. No noise monitoring experience. |
| Rannoch | Passive system | Satellite Timing | No. Uses satellite timing and there are no transmissions for synchronization | Yes. Widely used for noise monitoring, billing and other airport management applications. Over 200 AirScene sensors have been deployed. |

TABLE 2

| Feature/Issue | ASDE X | AirScene |
|---|---|---|
| Airport access to system data? | Only by agreement with FAA | Yes, system is autonomous |
| Coverage of Runways and Taxiways? | Yes | Yes |
| Coverage of gates, ramps, aprons? | Only if additional sensors are installed, coordinated with FAA and paid for by airport | Yes, coverage selected by airport |
| Coverage of airport? | Very limited with basic system, requires off airport sensors coordinated with FAA and paid for by airport | Yes, coverage selected by airport |
| Eminent Domain issues off-airport? | Yes | No, existing cell tower may be used |
| FAA involvement and approval required? | Yes | No, autonomous, passive system |
| Schedule driven by whom? | FAA | Airport |
| Used at US airports for airport management? | Unknown, no public information available | Yes, over 20 US airports use AirScene for airport management applications |
| Demonstrated for aircraft billing at US airports | Unknown, no public information available | Yes, several major, mid sized, and municipal airports use AirScene for billing |
| Demonstrated for revenue auditing at US airports | Unknown, no public information available | Yes |
| Demonstrated at US airports for noise and operations management | Unknown, no public information available | Yes, many US airports rely on AirScene for noise management |

We claim:

1. A method of performing real-time calculation of virtual emission levels caused by aircraft, comprising the steps of:

receiving, at a plurality of locations, radio signals from the aircraft;

time-stamping received radio signals from the aircraft with a time value indicating a time a radio signal is received at one of the plurality of locations;

calculating aircraft position and track from time stamps from the plurality of locations;

identifying the aircraft from data in the radio signals; and determining emissions levels generated by the aircraft, from aircraft position and track in real time and outputting aircraft emissions level data.

2. The method of claim 1, wherein at least one of the plurality of locations is a shared wireless communication tower.

3. The method of claim 1, further comprising the step of providing at least one of a real-time or delayed display of aircraft tracks and emission levels on an internet website.

4. The method of claim 1, wherein the step of determining emissions levels comprises the step of determining emissions levels using a predetermined algorithm based upon at least aircraft track, and one or more of aircraft type, aircraft weight, and engine type.

5. The method of claim 4, further comprising the steps of:

measuring aircraft emissions levels using at least one physical emissions monitor to measure actual aircraft emissions at a predetermined location, and comparing measured aircraft emissions with virtually determined emissions levels to validate the predetermined algorithm.

6. The method of claim 5, wherein the at least one physical emissions monitor is located at a shared wireless communication tower.

7. The method of claim 6, wherein at least one of the plurality of locations is the shared wireless communication tower.

8. A method of performing real-time calculation of virtual emission levels caused by aircraft, comprising the steps of:

receiving radio signals from the aircraft at a plurality of locations;

calculating, in a multilateration system, aircraft identification, position, and track from the radio signals;

determining emissions levels generated by the aircraft, from aircraft position and track in real time; and outputting aircraft emissions level data.

9. The method of claim 8, wherein at least one of the plurality of locations is a shared wireless communication tower.

10. The method of claim 8, further comprising the step of providing at least one of a real-time or delayed display of aircraft tracks and emission levels on an internet website.

11. The method of claim 8, wherein the step of determining emissions levels comprises the step of determining emissions levels using a predetermined algorithm based upon at least aircraft track, and one or more of aircraft type, aircraft weight, and engine type.

12. The method of claim 11, further comprising the steps of:

measuring aircraft emissions levels using at least one physical emissions monitor to measure actual aircraft emissions at a predetermined location, and comparing measured aircraft emissions with virtually determined emissions levels to validate the predetermined algorithm.

13. The method of claim 12, wherein the at least one physical emissions monitor is located at a shared wireless communication tower.

14. The method of claim 13, wherein at least one of the plurality of locations is the shared wireless communication tower.

\* \* \* \* \*